US008682567B2

(12) United States Patent
Nishioka et al.

(10) Patent No.: US 8,682,567 B2
(45) Date of Patent: Mar. 25, 2014

(54) INTAKE AIR CONTROL APPARATUS AND INTAKE AIR CONTROL METHOD FOR INTERNAL-COMBUSTION ENGINE

(75) Inventors: Futoshi Nishioka, Wako (JP); Hideharu Takamiya, Wako (JP); Masayoshi Nishino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 550 days.

(21) Appl. No.: 13/048,901

(22) Filed: Mar. 16, 2011

(65) Prior Publication Data

US 2011/0257870 A1 Oct. 20, 2011

(30) Foreign Application Priority Data

Apr. 15, 2010 (JP) ................................. 2010-093699

(51) Int. Cl.
*F02D 9/02* (2006.01)
*F02D 41/04* (2006.01)
*G06G 7/70* (2006.01)

(52) U.S. Cl.
USPC ......................................... 701/104; 123/676

(58) Field of Classification Search
USPC ................. 701/104, 103, 105, 101, 102, 109; 123/429, 672, 676, 703, 704
See application file for complete search history.

(56) References Cited

U.S. PATENT DOCUMENTS

| 4,284,053 A * | 8/1981 | Merrick ......................... 123/497 |
| 6,585,235 B2 * | 7/2003 | Pattullo ......................... 261/44.8 |
| 7,440,836 B2 * | 10/2008 | Yasui et al. .................... 701/101 |

FOREIGN PATENT DOCUMENTS

| JP | 2004-225612 | 8/2004 |
| JP | 2009-114963 | 5/2009 |
| JP | 2009-191666 | 8/2009 |
| JP | 2009-299666 | 12/2009 |

OTHER PUBLICATIONS

Japanese Office Action for corresponding JP Application No. 2010-093699, Jul. 25, 2013.

* cited by examiner

*Primary Examiner* — Hieu T Vo
(74) *Attorney, Agent, or Firm* — Ditthavong Mori & Steiner, P.C.

(57) ABSTRACT

An intake air control apparatus for an internal-combustion engine includes an intake air adjusting device. An operating mode determination device is configured to determine whether the internal-combustion engine is in a predetermined high rotation speed and high load operation mode in which cooling is required by increasing an amount of fuel. An intake air reduction controller is configured to, if the operating mode determination device determines that the internal-combustion engine is in the predetermined high rotation speed and high load operation mode, control the intake air adjusting device so that an intake air amount is reduced in accordance with a rotation speed of the internal-combustion engine and an ignition timing in order to restrict a fuel injection quantity to be injected from a fuel injection valve so that the fuel injection quantity does not exceed a maximum fueling rate of the fuel injection valve.

8 Claims, 21 Drawing Sheets

INTAKE AIR CONTROL APPARATUS AND INTAKE AIR CONTROL METHOD FOR INTERNAL-COMBUSTION ENGINE

CROSS-REFERENCE TO RELATED APPLICATIONS

The present application claims priority under 35 U. S.C. §119 to Japanese Patent Application No. 2010-093699 filed in the Japan Patent Office on Apr. 15, 2010 entitled "Intake Air Control Apparatus for Internal-Combustion Engine." The entire contents of this application are incorporated herein by reference in their entirety.

BACKGROUND OF THE INVENTION

1. Field of the Invention

The present invention relates to an intake air control apparatus and an intake air control method for an internal-combustion engine.

2. Description of the Related Art

An example of an existing control apparatus for an internal-combustion engine is described in Japanese Unexamined Patent Application Publication No. 2004-225612. This internal-combustion engine includes a port fuel injection valve for injecting fuel to an intake port. In addition, the control apparatus performs control to increase fuel supplied to the internal-combustion engine when the opening of a throttle valve is larger than predetermined reference opening. At that time, the increase in fuel is set to a larger value as the rotation speed of the engine increases and as the amount of basic fuel consumption increases. The increased fuel cools the internal-combustion engine and a catalyst. In this way, overheating of the internal-combustion engine and catalyst can be prevented.

However, if the amount of the supplied fuel is increased in the above-described manner, the amount of the supplied fuel is further increased from that in a high rotation and high load operation in which fuel is highly consumed. At that time, an existing control apparatus only sets an increase in supplied fuel in accordance with the rotation speed of the engine and the amount of basic fuel consumption. Accordingly, the fuel injection quantity including the increased amount may exceed a maximum fuel quantity suppliable by the fuel injection valve (hereinafter, referred to as a "maximum fueling rate"). Thus, the required fuel quantity may not be supplied. In such a case, it is difficult to prevent overheating of a catalyst. In addition, the air-fuel ratio of the mixture of air and fuel may be disadvantageously shifted from the desired air-fuel ratio.

For example, in the case of a port fuel injection valve as in existing internal-combustion engines, fuel injection can be made at any point in time during one combustion cycle. Accordingly, the fuel can be supplied within a long allowable period of time. However, in the case of a direct injection valve that directly injects fuel into a cylinder of an internal-combustion engine, the effective injection period is limited to, for example, a compression stroke period. Thus, since the effective injection period is significantly short, a required fuel quantity may not be supplied. Alternatively, when the quality of the fuel used is low and, therefore, engine knock easily occurs, the ignition timing needs to be retarded in order to prevent engine knock. Thus, the catalyst easily overheats. Accordingly, in order to prevent overheating, an increase in controlled fuel quantity needs to be large. As a result, the same problem easily occurs.

SUMMARY OF THE INVENTION

According to one aspect of the present invention, an intake air control apparatus for an internal-combustion engine includes an intake air adjusting device, a rotation speed detector, an ignition timing acquiring device, an operating mode determination device, and an intake air reduction controller. An air-fuel ratio of an air-fuel mixture of fuel injected from a fuel injection valve and air drawn into a cylinder is controlled so as to be a predetermined value in the internal-combustion engine. The intake air adjusting device is configured to adjust an intake air amount. The rotation speed detector is configured to detect a rotation speed of the internal-combustion engine. The ignition timing acquiring device is configured to acquire ignition timing for the internal-combustion engine. The operating mode determination device is configured to determine whether the internal-combustion engine is in a predetermined high rotation speed and high load operation mode in which cooling is required by increasing an amount of fuel. The intake air reduction controller is configured to, if the operating mode determination device determines that the internal-combustion engine is in the predetermined high rotation speed and high load operation mode, control the intake air adjusting device so that the intake air amount is reduced in accordance with the rotation speed of the internal-combustion engine detected by the rotation speed detector and the ignition timing acquired by the ignition timing acquiring device in order to restrict a fuel injection quantity to be injected from the fuel injection valve so that the fuel injection quantity does not exceed a maximum fueling rate of the fuel injection valve.

According to another aspect of the present invention, an intake air control method for an internal-combustion engine includes adjusting an intake air amount. An air-fuel ratio of an air-fuel mixture of fuel injected from a fuel injection valve and air drawn into a cylinder is controlled so as to be a predetermined value in the internal-combustion engine. A rotation speed of the internal-combustion engine is detected. Ignition timing for the internal-combustion engine is acquired. It is determined whether the internal-combustion engine is in a predetermined high rotation speed and high load operation mode in which cooling is required by increasing an amount of fuel. The intake air amount is reduced in accordance with the rotation speed of the internal-combustion engine and the ignition timing in order to restrict a fuel injection quantity to be injected from the fuel injection valve so that the fuel injection quantity does not exceed a maximum fueling rate of the fuel injection valve if the internal-combustion engine is in the predetermined high rotation speed and high load operation mode.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
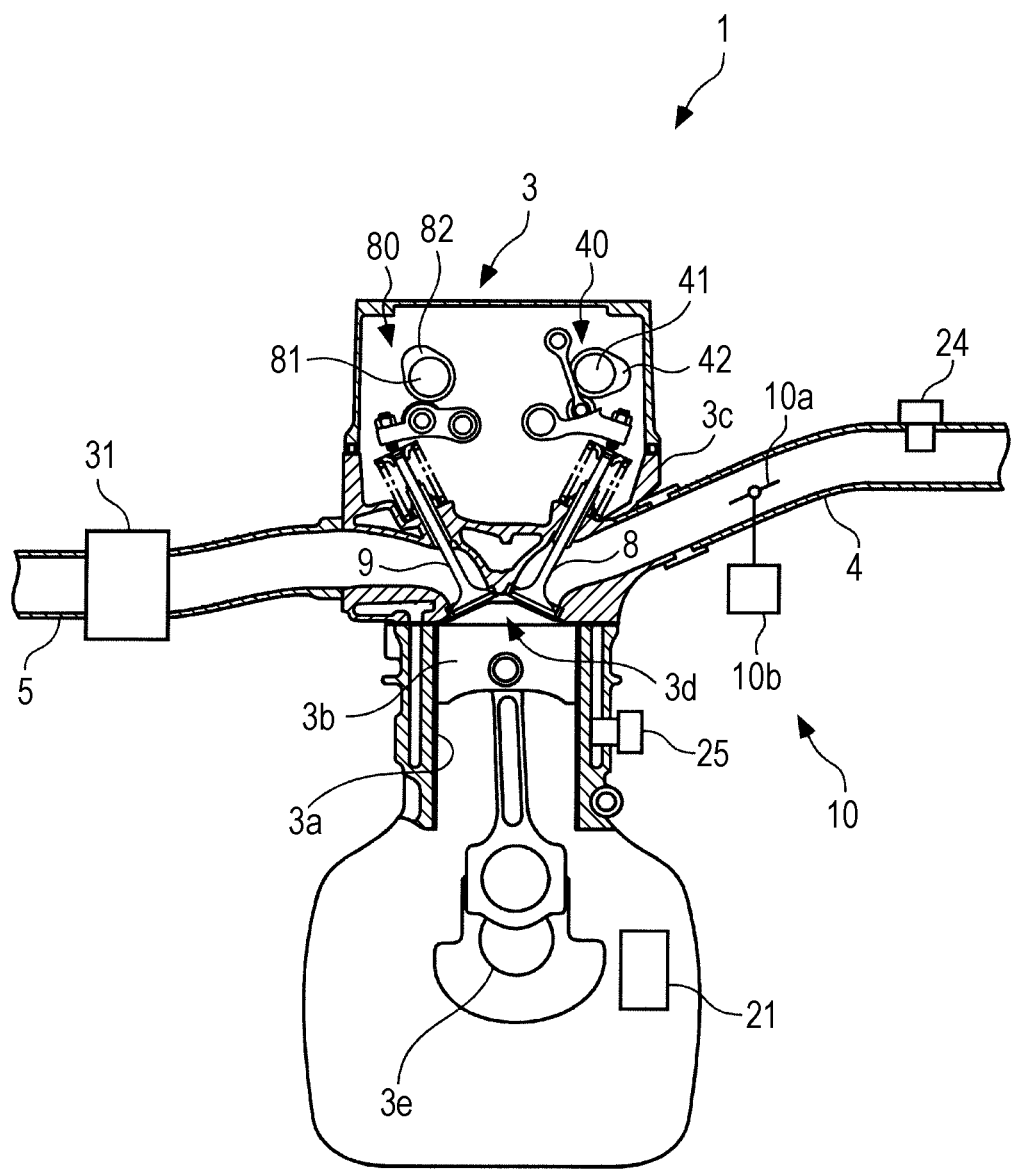
FIG. 1 is a schematic illustration of an intake air control apparatus for an internal-combustion engine according to an embodiment of the present invention and the internal-combustion engine.

The embodiments of the present invention are described in detail below with reference to the accompanying drawings, wherein like reference numerals designate corresponding or identical elements throughout the various drawings. FIG. 1 illustrates an internal-combustion engine 3 (hereinafter simply referred to as an "engine") including an intake air control apparatus 1 according to an embodiment of the present invention. The engine 3 is a gasoline engine mounted in a vehicle (not shown). For example, the engine 3 includes four cylinders 3a (only one is shown here). Each of the cylinders 3a has a piston 3b and a cylinder head 3c. The cylinder 3a further has a combustion chamber 3d formed between the piston 3b and the cylinder head 3c.

The cylinder head 3c of each of the cylinders 3a has an intake passage 4 and an exhaust passage 5 connected thereto. The cylinder head 3c further has a fuel injection valve 6 and a spark plug 7 (refer to FIG. 2) attached thereto. The fuel injection valve 6 is formed as an in-cylinder injection valve that directly injects fuel into the cylinder 3a. A fuel injection quantity QINJ injected from the fuel injection valve 6 and the timing of fuel injection are controlled by a control signal supplied from an ECU 2 (described below). In addition, the ignition timing TIG of the spark plug 7 is also controlled by a control signal supplied from the ECU 2.

In addition, each of the cylinders 3a has a pair of air intake valves 8 (only one is shown) and a pair of exhaust valves 9 (only one is shown). Each of the air intake valves 8 is opened and closed by an intake valving mechanism 40. Each of the exhaust valves 9 is opened and closed by an exhaust valving mechanism 80. These intake valving mechanism 40 and exhaust valving mechanism 80 are described below with reference to FIGS. 3 and 4.

The intake valving mechanism 40 is formed as a variable valving mechanism that continuously changes lifting and valving timing of each of the air intake valves 8. As used herein, the term "lift of the air intake valve 8" (hereinafter referred to as "intake lift") refers to a maximum lifting height of the air intake valves 8.

Figure 4:
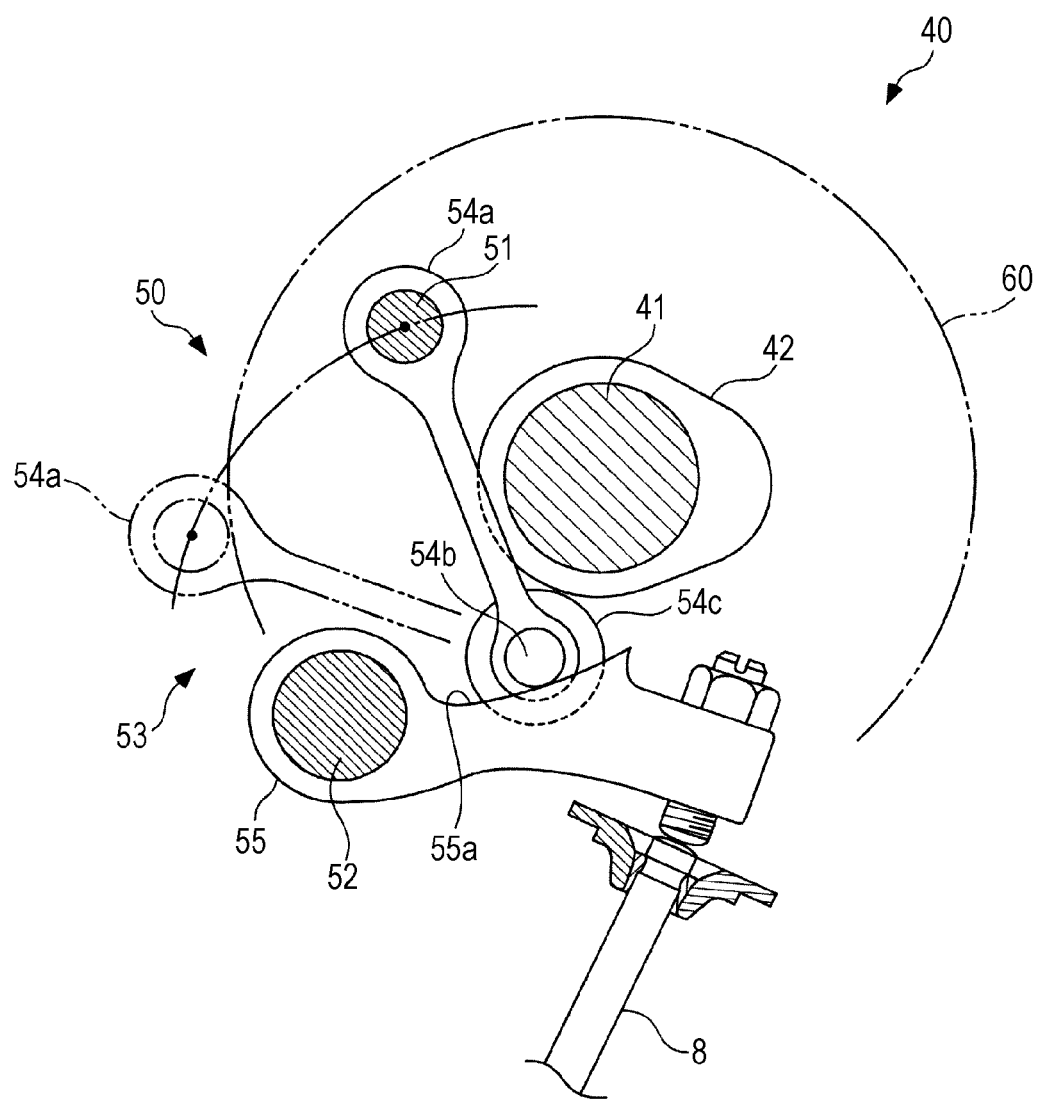
FIG. 4 is a schematic illustration of an exemplary intake valving mechanism.

As shown in FIG. 4, the intake valving mechanism 40 includes an intake camshaft 41, an intake cam 42, an intake lift varying mechanism 50, and an intake cam phase varying mechanism 60.

The intake camshaft 41 includes the intake cam 42 in an integrated manner. The intake camshaft 41 is connected to a crankshaft 3e via an intake sprocket and a timing chain (neither is shown). The intake camshaft 41 rotates through one revolution when the crankshaft 3e makes two revolutions.

Figure 5:
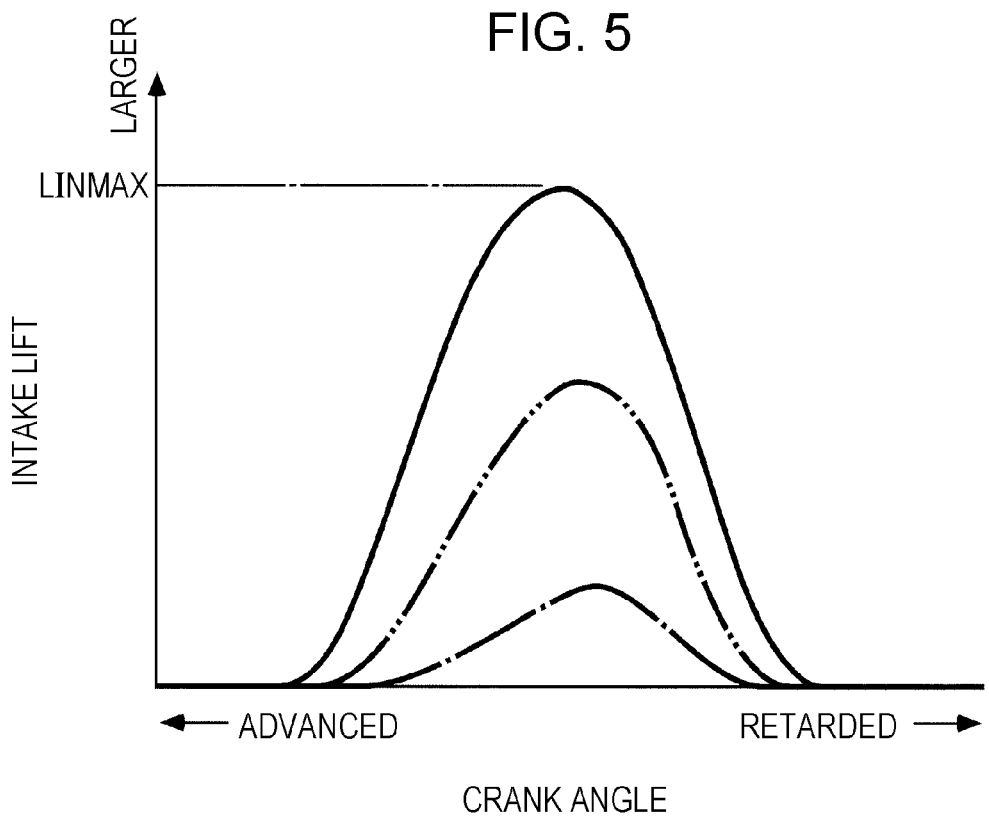
FIG. 5 illustrates the characteristic of an intake lift of an intake lift varying mechanism.

The intake lift varying mechanism 50 continuously changes the intake lift between the value 0 and a predetermined maximum lift LINMAX (refer to FIG. 5). Since the structure of the intake lift varying mechanism 50 is described in Japanese Unexamined Patent Application Publication No. 2007-100522, which was applied for by the present inventors, description thereof is only briefly made below.

Figure 2:
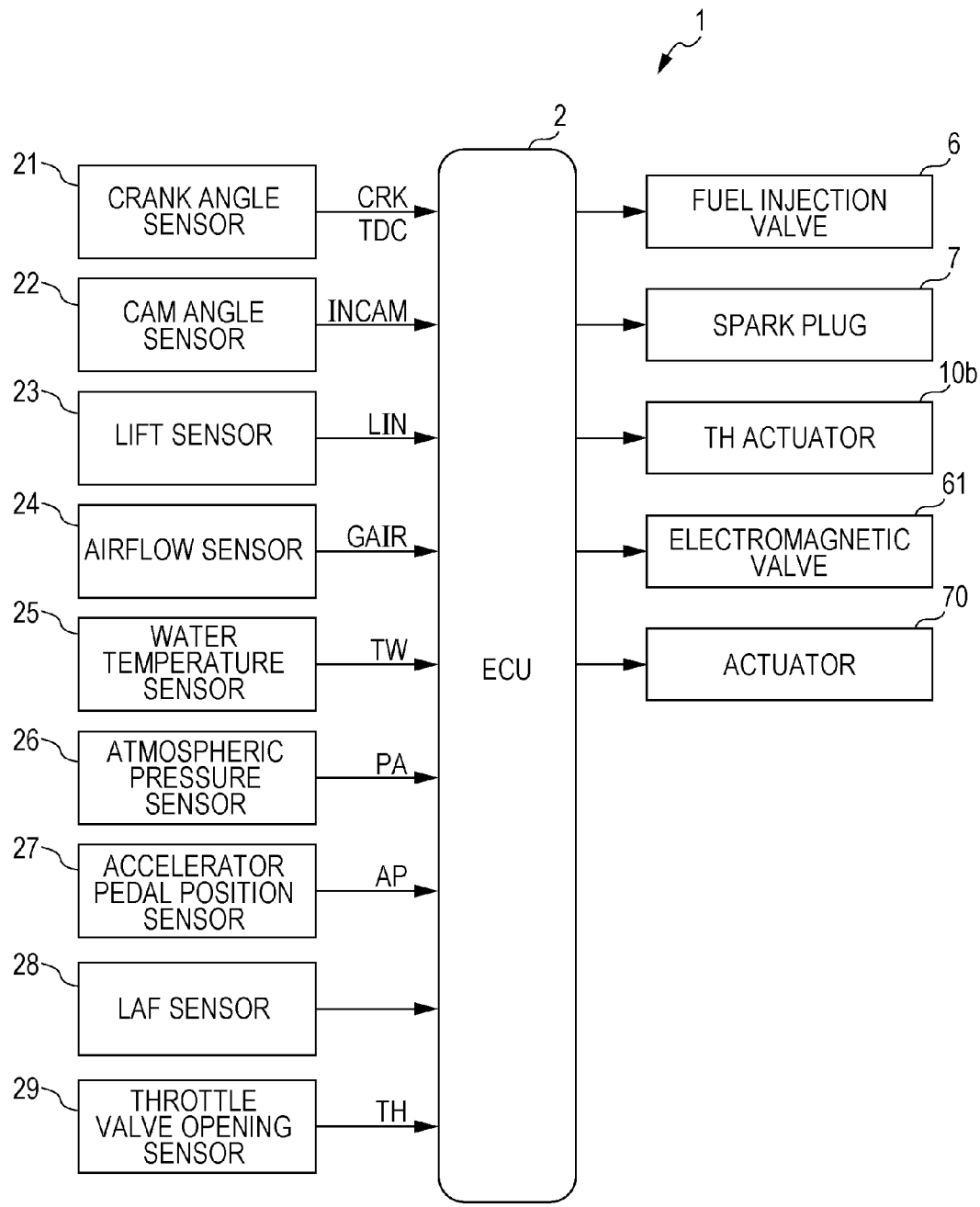
FIG. 2 is a block diagram illustrating an exemplary configuration of the intake air control apparatus.

The intake lift varying mechanism 50 includes a control shaft 51, a rocker arm shaft 52, a rocker arm mechanism 53 provided on the control shaft 51 and the rocker arm shaft 52 for each of the cylinders 3a, and an actuator 70 that simultaneously drives a plurality of the rocker arm mechanisms 53 (refer to FIG. 2).

The rocker arm mechanism 53 includes a link 54a, a roller shaft 54b, a roller 54c, and a rocker arm 55. The actuator 70 is formed by assembling a motor and a reduction gear set (neither is shown). The actuator 70 rotates the control shaft 51 in accordance with a control signal received from the ECU 2. Thus, the link 54a is rotated about the roller shaft 54b.

When the link 54a is located at a zero lift position shown as a solid line in FIG. 4 and if the roller 54c is urged against the rocker arm shaft 52 by the intake cam 42 in accordance with revolution of the intake camshaft 41, the link 54a rotates about the control shaft 51 in a clockwise direction shown in FIG. 4. At that time, a guiding surface 55a of the rocker arm 55 has a shape corresponding to a circular arc, at the center of which is the control shaft 51. Accordingly, the rocker arm 55 is maintained at a closed valve position shown in FIG. 4 due to the pressing force exerted by a valve spring. In this way, the intake lift is maintained at a value 0, and the air intake valves 8 stay in a closed valve state.

In contrast, when the link 54a rotates from the zero lift position to a position on the side of the maximum lift position (a position indicated by an alternate long and two short dashes line shown in FIG. 4) and stays at that position and if the link 54a is rotated about the control shaft 51 in a clockwise direction shown in FIG. 4 due to the rotation of the intake cam 42, the rocker arm 55 rotates downward from the closed valve position shown in FIG. 4 against the pressing force received from the valve spring and closes the air intake valves 8. At that time, the amount of rotation of the rocker arm 55, that is, the intake lift becomes larger as the link 54a comes to be closer to the maximum lift position.

In the above-described structure, each of the air intake valves 8 is opened with a larger lift as the link 54a comes to be located closer to the maximum lift position. More specifically, during rotation of the intake cam 42, when the link 54a is located at the maximum lift position, the air intake valve 8 is opened while following a valve lift curve shown as a solid line shown in FIG. 5. At that time, the intake lift becomes a maximum lift LINMAX. Thus, in the intake lift varying mechanism 50, by rotating the link 54a between the zero lift position and the maximum lift position using the actuator 70, the intake lift can be continuously changed between the value 0 and the predetermined maximum lift LINMAX. If intake cam phases CAIN (described below) are the same, the valve opening timing of the air intake valves 8 becomes advanced and the valve closing timing becomes retarded as the intake lift becomes larger.

In addition, the intake lift varying mechanism 50 includes a lift sensor 23 for detecting the intake lift (refer to FIG. 2). The lift sensor 23 detects the rotation angle of the control shaft 51 and outputs a detection signal indicating the rotation angle to the ECU 2 as an intake lift LIN.

The intake cam phase varying mechanism 60 continuously shifts the intake cam phase CAIN, which is a phase of the intake camshaft 41 relative to the phase of the crankshaft 3e, to the advancing or retarded side. Since the structure of the intake cam phase varying mechanism 60 is described in Japanese Unexamined Patent Application Publication No. 2005-315161, which was applied for by the present inventors, description thereof is only briefly made below.

Figure 6:
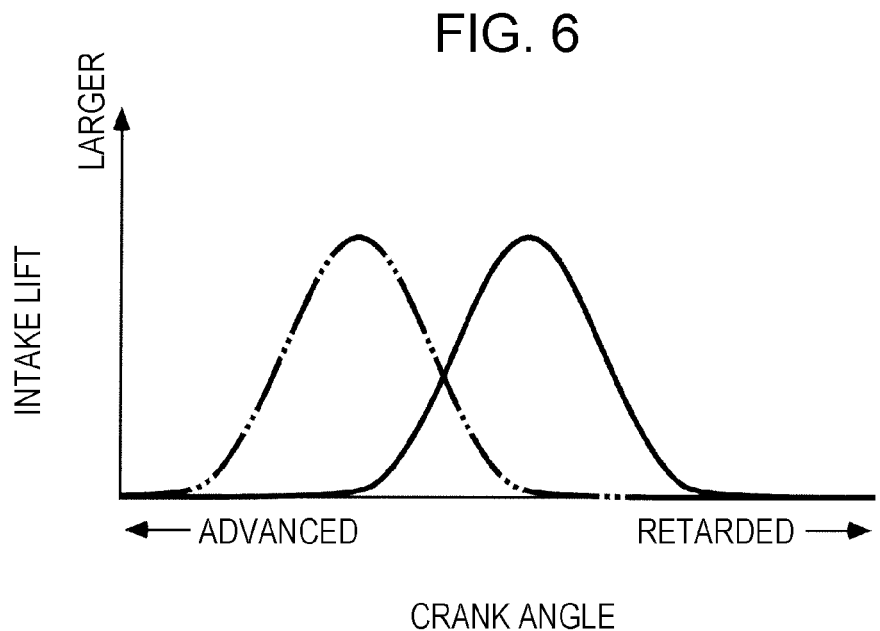
FIG. 6 illustrates a valve lift curve of an air intake valve when an intake cam phase is most retarded (shown as a solid line) and is most advanced (shown as an alternate long and two short dashes line) using an intake cam phase varying mechanism.

The intake cam phase varying mechanism 60 is provided at one end of the intake camshaft 41 adjacent to the intake sprocket. The intake cam phase varying mechanism 60 includes an electromagnetic valve 61 (refer to FIG. 2) and advance and retard chambers (neither is shown) to which hydraulic pressures are applied via the electromagnetic valve 61. By changing hydraulic pressures applied to the advance and retard chambers in accordance with a control signal received from the ECU 2, the electromagnetic valve 61 continuously changes the intake cam phase CAIN between the predetermined most retarded value and the predetermined most advanced value in accordance with a control signal output from the ECU 2. In this way, the valve timing of the air intake valve 8 is continuously changed between the most retarded timing shown as a solid line in FIG. 6 and the most advanced timing shown as an alternate long and two short dashes line in FIG. 6.

In addition, a cam angle sensor 22 (refer to FIG. 2) is provided to the other end of the intake camshaft 41 that is opposite to the end having the intake cam phase varying mechanism 60. The cam angle sensor 22 outputs an INCAM signal, which is a pulse signal, to the ECU 2 each time the intake camshaft 41 rotates by a predetermined cam angle (e.g., 1°). The ECU 2 computes the intake cam phase CAIN on the basis of the INCAM signal and a CRK signal described below.

Figure 3:
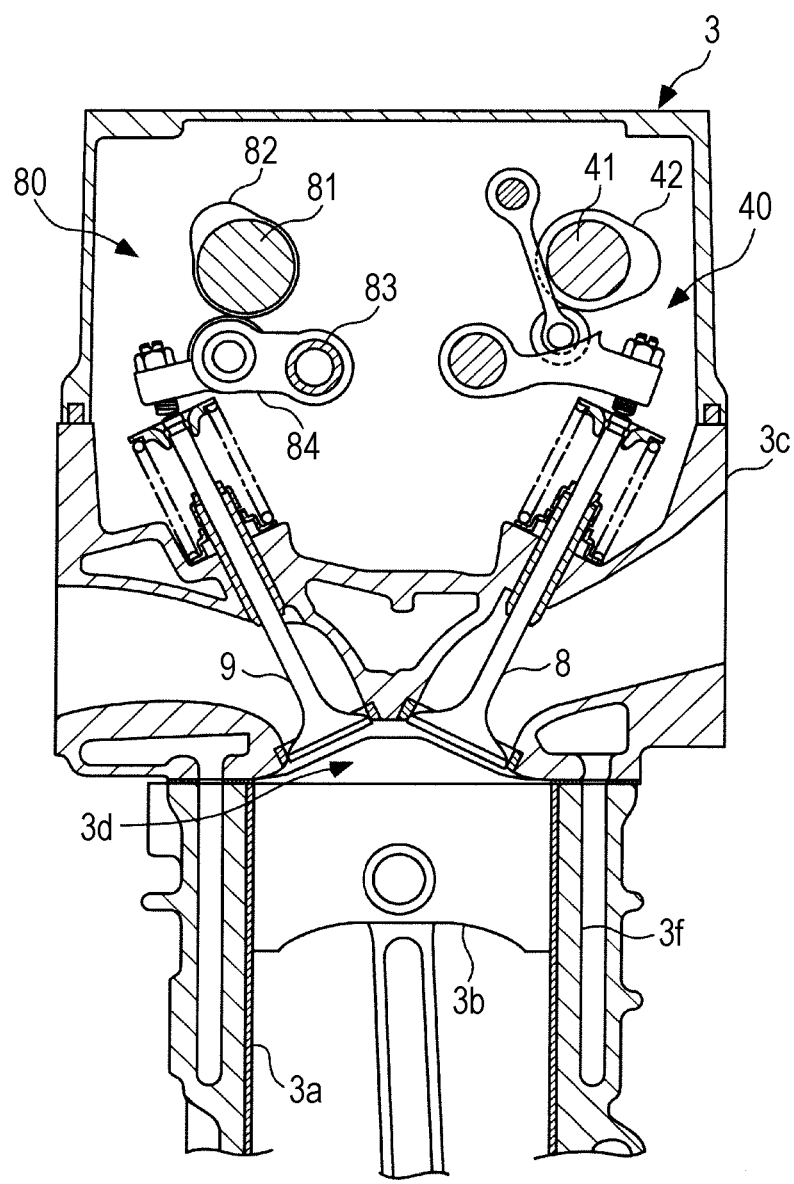
FIG. 3 is a partial magnified view of FIG. 1.

The exhaust valving mechanism 80 is of a widely used cam driven type. As shown in FIG. 3, the exhaust valving mechanism 80 includes a rotatable exhaust camshaft 81, an exhaust cam 82 that is integrated into the exhaust camshaft 81, a rocker arm shaft 83, and two rocker arms 84 (only one is shown) that are rotatably supported by the rocker arm shaft 83 and that are in contact with the upper ends of the exhaust valves 9.

The exhaust camshaft 81 is connected to the crankshaft 3e via an exhaust sprocket and a timing chain (neither is shown). The exhaust camshaft 81 rotates through one revolution when the crankshaft 3e makes two revolutions. When the exhaust camshaft 81 rotates, each of the two rocker arms 84 is pressed by the exhaust cam 82 and rotates about the rocker arm shaft 83. Thus, the exhaust valves 9 are closed.

An airflow sensor 24 and a throttle valve mechanism 10 are sequentially disposed in the intake passage 4 from the upstream side. The airflow sensor 24 detects an intake air amount GAIR that is drawn into the cylinder 3a of the engine 3 and outputs a detection signal for the amount to the ECU 2.

The throttle valve mechanism 10 includes a throttle valve 10a and a TH actuator 10b that drives the throttle valve 10a. The opening of the throttle valve 10a is controlled by controlling the duty ratio of an electrical current supplied to the TH actuator 10b using the ECU 2. In this way, the intake air amount GAIR is controlled.

In addition, the opening TH of the throttle valve 10a (hereinafter referred to as "throttle valve opening TH") is detected by a throttle valve opening sensor 29. The throttle valve opening sensor 29 outputs a detection signal for the throttle valve opening to the ECU 2.

A three-way catalyst 31 and an LAF sensor 28 (refer to FIG. 2) are disposed in the exhaust passage 5 of the engine 3. The three-way catalyst 31 oxidizes CO and HC contained in exhaust gas. In addition, the three-way catalyst 31 reduces $NO_x$ contained in exhaust gas. Thus, the three-way catalyst 31 cleans the exhaust gas.

The LAF sensor 28 linearly detects the level of oxygen in exhaust gas flowing in the exhaust passage 5 within a wide range from a rich region in which the air fuel ratio is higher than the theoretical air fuel ratio to an ultra lean region. The LAF sensor 28 then outputs a detection signal for the level of oxygen to the ECU 2. The ECU 2 computes the air fuel ratio of the exhaust gas, that is, an air fuel ratio AF of an air-fuel mixture on the basis of the detection signal received from the LAF sensor 28.

The crankshaft 3e of the engine 3 includes a crank angle sensor 21 mounted thereon. The crank angle sensor 21 outputs a CRK signal and a TDC signal, which are pulse signals, to the ECU 2 when the crankshaft 3e rotates.

The CRK signal is output at every predetermined crank angle (e.g., 30°). The ECU 2 computes the number of rotations NE of the engine 3 (hereinafter referred to as an "engine speed NE") on the basis of the CRK signal. The TDC signal indicates that the piston 3b is located at a predetermined crank angle position slightly before the top dead center of any one of the cylinders 3a when an intake stroke is started. When the engine 3 has four cylinders as in the present embodiment, the TDC signal is output at every crank angle of 180°.

The engine 3 further includes a water temperature sensor 25. The water temperature sensor 25 detects a temperature TW of cooling water that circulates in a cylinder block 3f of the engine 3 (hereinafter referred to as an "engine water temperature TW") and outputs a detection signal for the engine water temperature TW to the ECU 2.

In addition, the ECU 2 receives a detection signal indicating atmospheric pressure PA from an atmospheric pressure sensor 26 and a detection signal indicating the position of an accelerator pedal of the vehicle (not shown) (hereinafter referred to as a "degree of accelerator opening AP") from an accelerator pedal position sensor 27.

The ECU 2 is formed from a microcomputer including a central processing unit (CPU), a random access memory (RAM), a read only memory (ROM), and an input/output (I/O) interface (none are shown). The ECU 2 determines the operating mode of the engine 3 on the basis of the detection signals output from the above-described sensors 21 to 29 and performs a variety of control processes on the engine 3 on the basis of the determined operating mode. Note that according to the present embodiment, the ECU 2 corresponds to an ignition timing acquiring unit, an operating mode determination unit, and an intake air reduction control unit.

Figure 7:
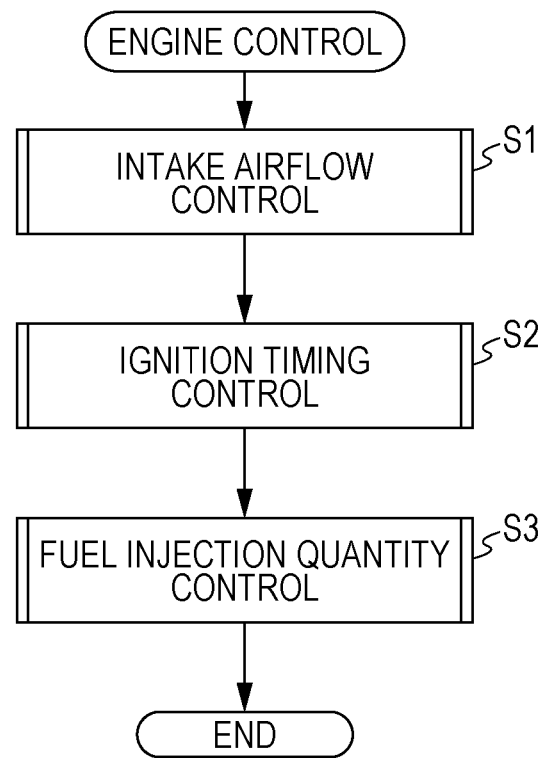
FIG. 7 is a flowchart illustrating a main flow of an engine control process.

FIG. 7 is a flowchart of a main process for controlling the engine 3 performed by the ECU 2. This process is performed in synchronization with generation of the TDC signal. In step S1, a process for controlling the intake air amount GAIR is performed. Subsequently, a process for controlling the ignition timing TIG is performed (step S2). In addition, a process for controlling the fuel injection quantity QINJ is performed (step S3). Thereafter, the main process is completed.

Figure 8:
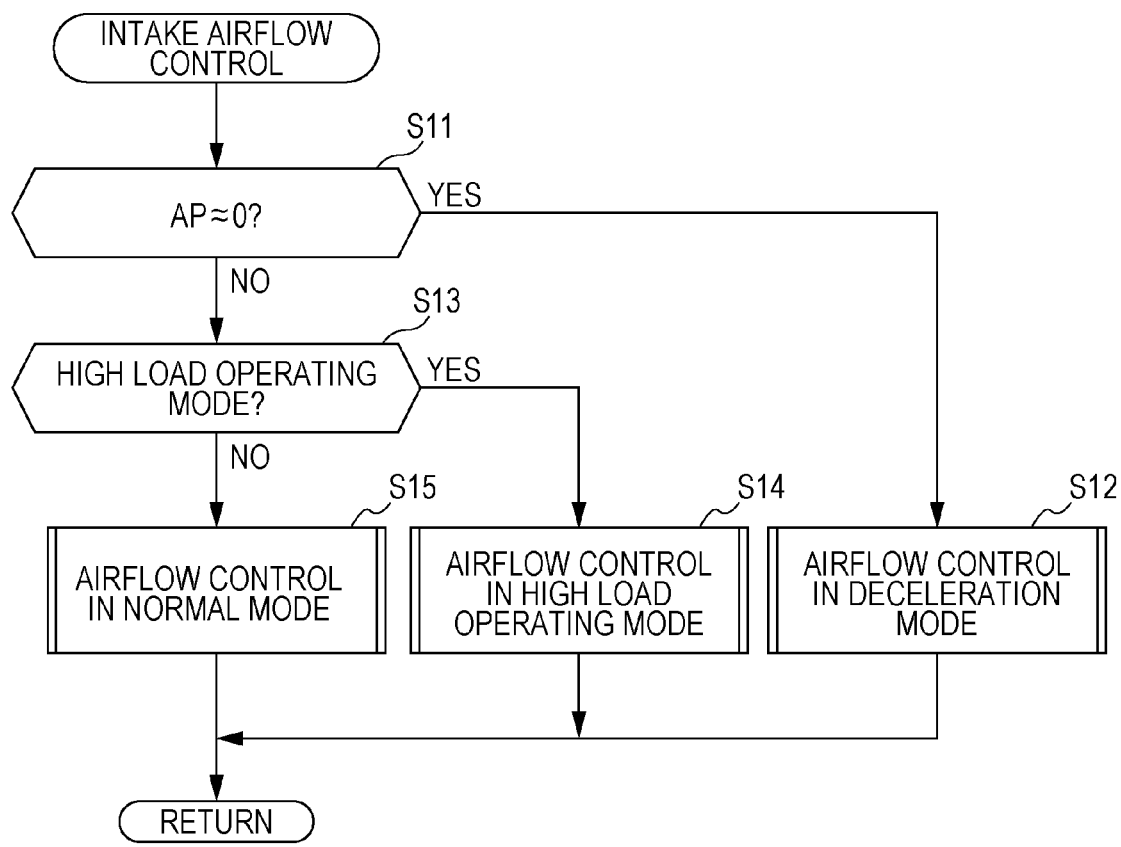
FIG. 8 illustrates a sub-routine indicating an intake air control process.

FIG. 8 is a flowchart of a sub-routine for controlling the intake air amount GAIR. In step S11 of this process, it is determined whether the degree of accelerator opening AP is substantially zero. When the determination is "YES" (i.e., AP≈0), it is determined that the engine 3 is in a deceleration mode. Accordingly, an airflow control process for a deceleration mode is performed (step S12). Thereafter, the process of the sub-routine is completed. The airflow control process for a deceleration mode is described in more detail below.

However, if, in step S11, the determination is "NO", it is determined whether the engine 3 is in a high load operation mode (step S13). This determination is made by searching a predetermined map (not shown) for a value corresponding to an engine speed NE and the fuel injection quantity QINJ. If the values of the engine speed NE and the fuel injection quantity QINJ lie in the high load operation range of the map, it is determined that the engine 3 is in a high load operation mode. If, in step S13, the determination is "YES", an airflow control process for a high load operation mode is performed (step S14). Thereafter, the process of the sub-routine is completed. The airflow control process for a high load operation is described in more detail below.

However, if, in step S13, the determination is "NO", the airflow control process for a normal operation is performed (step S15). Thereafter, the process of the sub-routine is completed. In the airflow control process for a normal operation, a target throttle valve opening THCMD, which is a target value of the throttle valve opening TH, is computed in accordance with the degree of accelerator opening AP.

In addition, a target intake cam phase CAINCMD, which is a target value of the intake cam phase CAIN, and a target intake lift LINCMD, which is a target value of the intake lift LIN, are set by searching maps (not shown) of the target intake cam phase CAINCMD and the target intake lift LINCMD for values corresponding to the engine speed NE and required torque PMCMD for a normal operation. Note that the required torque PMCMD is computed by searching a predetermined map (not shown) for a value corresponding to the engine speed NE and the degree of accelerator opening AP.

Figure 9:
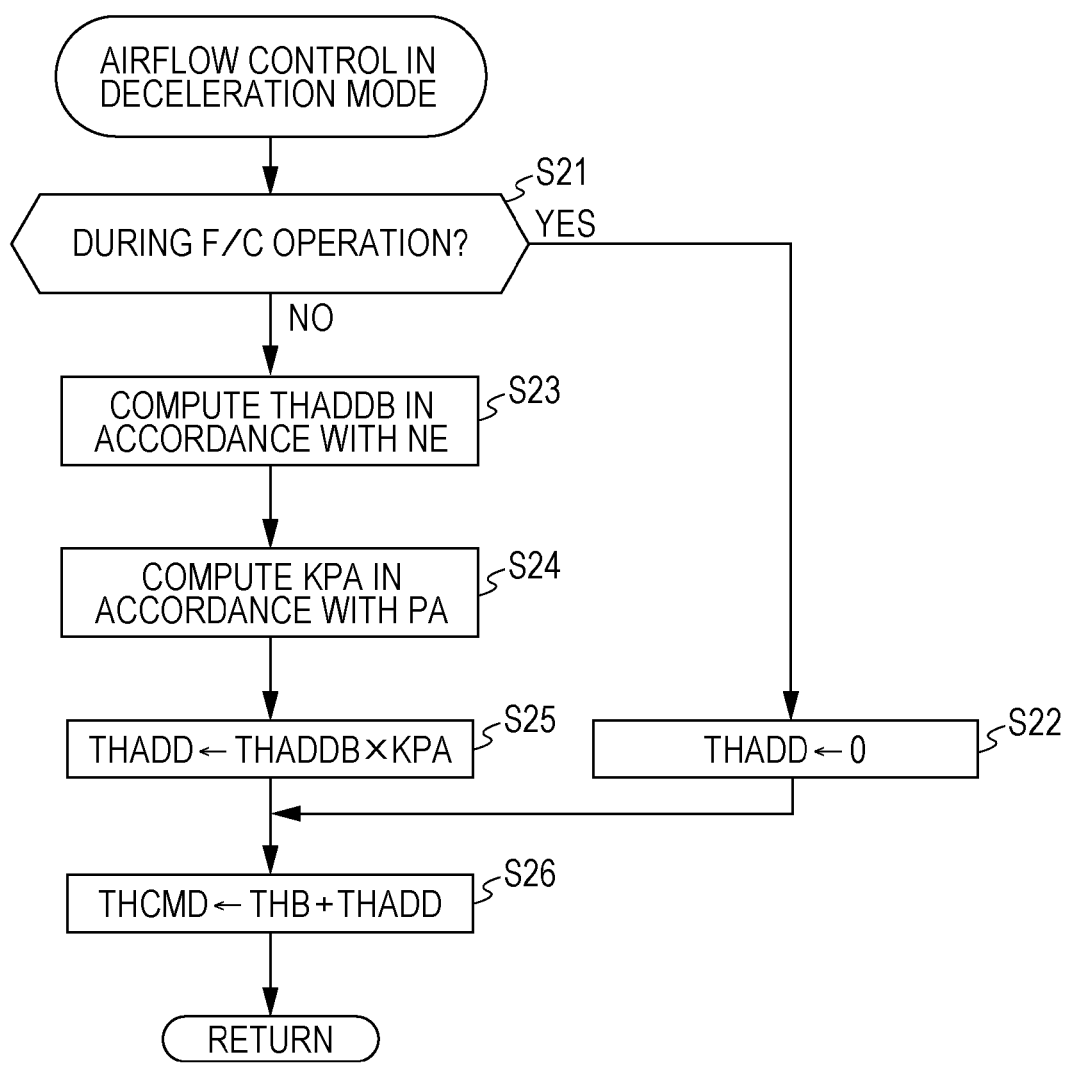
FIG. 9 illustrates a sub-routine indicating an airflow control process in a deceleration mode.

FIG. 9 illustrates a sub-routine indicating the airflow control process in a deceleration operation in step S12 shown in FIG. 8. In step S21 of this process, it is determined whether fuel cut (hereinafter simply referred to as "F/C") in which supply of fuel from the fuel injection valve 6 is stopped is being performed. If the determination is "YES", an addition correction term THADD is set to 0 (step S22).

Subsequently, the addition correction term THADD is added to a base value THB of the throttle valve opening TH. In this way, the target throttle valve opening THCMD is computed (step S26). Thereafter, this process is completed. In this case, since THADD=0, the target throttle valve opening THCMD is equal to the base value THB. Note that the base value THB represents a minimum air amount required for maintaining an idling operation. For example, the base value THB is determined in accordance with the engine water temperature TW and the operation mode of an auxiliary machine, such as an air conditioner (not shown).

However, if, in step S21, the determination is "NO", that is, if the engine 3 is in a deceleration mode with fuel being supplied from the fuel injection valve 6 to the engine 3, control to increase the intake air amount GAIR is performed in steps subsequent to step S23 so that the fuel injection quantity QINJ is not smaller than a minimum fuel supply amount QMIN of the fuel injection valve 6.

Figure 10:
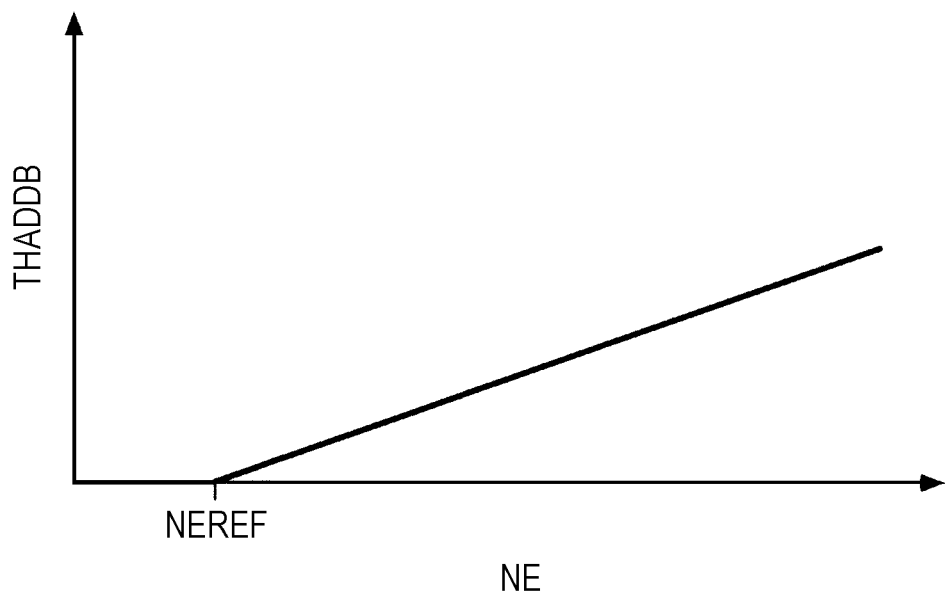
FIG. 10 is a table used for computing a base value of an addition correction term in the process shown in FIG. 9.

First, in step S23, a base value THADDB of the addition correction term THADD is computed by searching a table shown in FIG. 10 for a value corresponding to the engine speed NE. In this table, the base value THADDB is set to a predetermined value (e.g., 0) when the engine speed NE is lower than a predetermined rotation speed NEREF (e.g., 1000 rpm). When the engine speed NE is higher than or equal to the predetermined rotation speed NEREF, the base value THADDB is set to a higher value as the engine speed NE increases. This is because a period of time required for one intake stroke becomes smaller as the engine speed NE increases and, therefore, it is difficult for air to enter the cylinder 3a. By doing so, the amount of air that enters the cylinder 3a is compensated.

Figure 11:
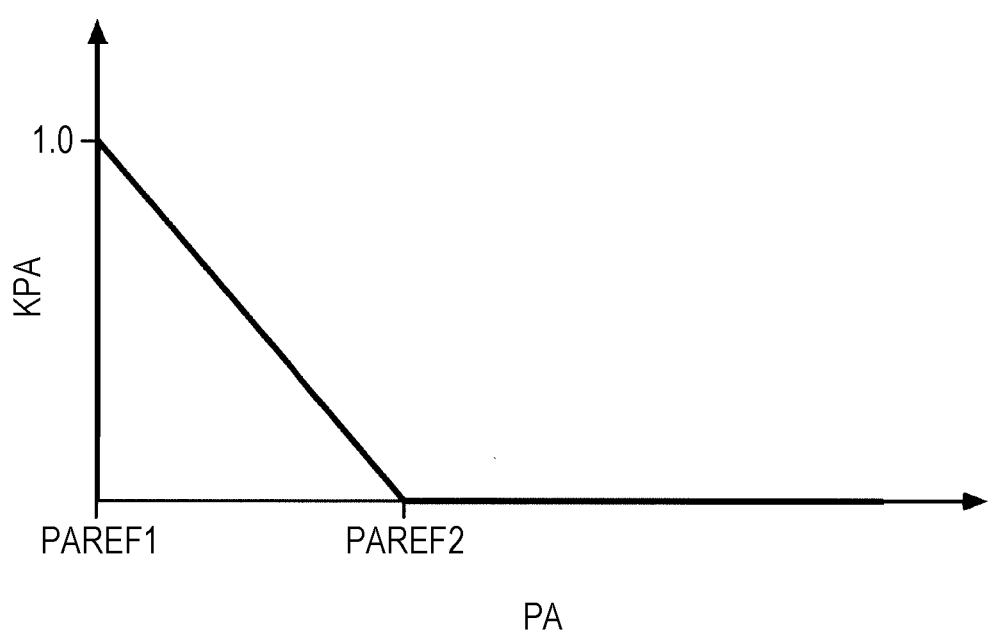
FIG. 11 is a table used for computing an atmospheric pressure correction coefficient.

Subsequently, an atmospheric pressure correction coefficient KPA is computed by searching a table shown in FIG. 11 for a value corresponding to the atmospheric pressure PA (step S24). In this table, when the atmospheric pressure PA is a first predetermined value PAREF1, the atmospheric pressure correction coefficient KPA is set to 1.0. However, when the atmospheric pressure PA is higher than or equal to a second predetermined value PAREF2 that is greater than the first predetermined value PAREF1, the atmospheric pressure correction coefficient KPA is set to a predetermined value (e.g., 0). When the atmospheric pressure PA is in the range between the first predetermined value PAREF1 and the second predetermined value PAREF2, the atmospheric pressure correction coefficient KPA is set to a higher value as the atmospheric pressure PA decreases. This is to prevent a decrease in an effective amount of air drawn into the cylinder 3a, since the density of air decreases with a decrease in the atmospheric pressure PA.

Subsequently, the addition correction term THADD is computed by multiplying the computed base value THADDB by the atmospheric pressure correction coefficient KPA (step S25). Thereafter, the processing proceeds to step S26, where the addition correction term THADD is added to the base value THB of the throttle valve opening TH. In this way, the target throttle valve opening THCMD is computed. Thereafter, this process is completed.

As described above, according to this process, in a deceleration mode in which fuel is supplied from the fuel injection valve 6, the addition correction term THADD computed in accordance with the engine speed NE and the atmospheric pressure PA is added to the base value THB. In this way, the target throttle valve opening THCMD is corrected so as to increase and, thus, the intake air amount GAIR is controlled so as to increase.

Figure 12:
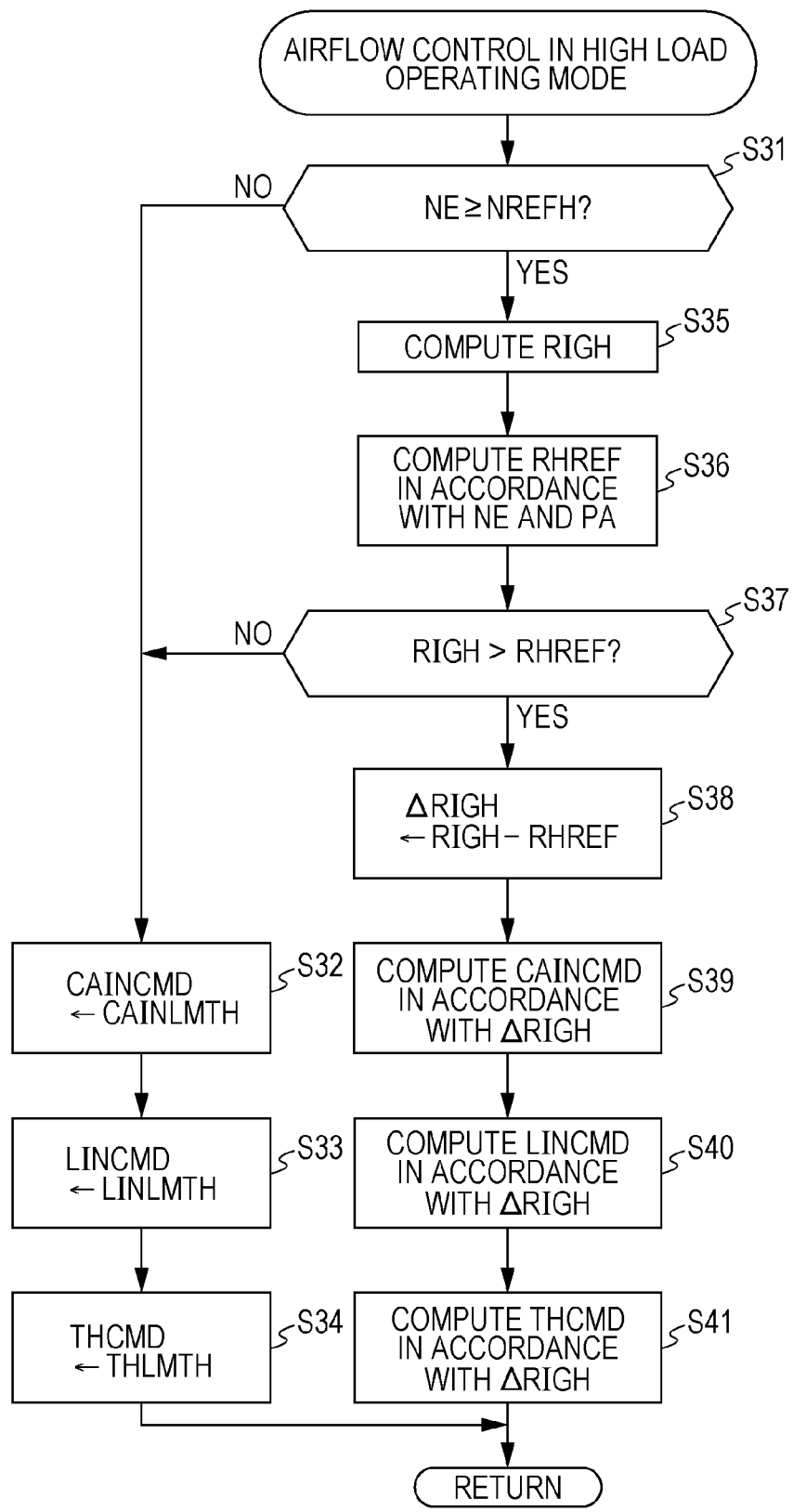
FIG. 12 illustrates a sub-routine indicating an airflow control process in a high load operating mode.

FIG. 12 illustrates a sub-routine indicating the airflow control process performed in step S14 shown in FIG. 8 in a high load operating mode. In this process, in step S31, it is determined whether the engine speed NE is higher than or equal to a required rotation speed NREFH in a high rotation speed mode (e.g., 5000 rpm). If the determination is "NO", the engine 3 is not in a high rotation speed mode, and the fuel injection quantity QINJ does not exceed a maximum suppliable fuel quantity QMAX of the fuel injection valve 6 (hereinafter referred to as a "maximum fueling rate of the fuel injection valve 6"). For this reason, control to decrease the intake air amount GAIR is not performed. In order to ensure a large intake air amount GAIR required for a high load operation, the target intake cam phase CAINCMD is set to a predetermined maximum advance value CAINLMTH (step S32), and the target intake lift LINCMD is set to a predetermined maximum value LINLMTH (step S33). In addition, the target throttle valve opening THCMD is set to a predetermined maximum value THLMTH (step S34). Thereafter, this process is completed.

However, if, in step S31, the determination is "YES" and the engine 3 is in a high rotation speed and high load operation mode, the amount of retardation of ignition timing RIGH is computed (step S35). For example, the amount of retardation of the ignition timing RIGH can be computed as a difference between the ignition timing TIG and ignition timing MBT which means Minimum spark advance for Best Torque.

Figure 13:
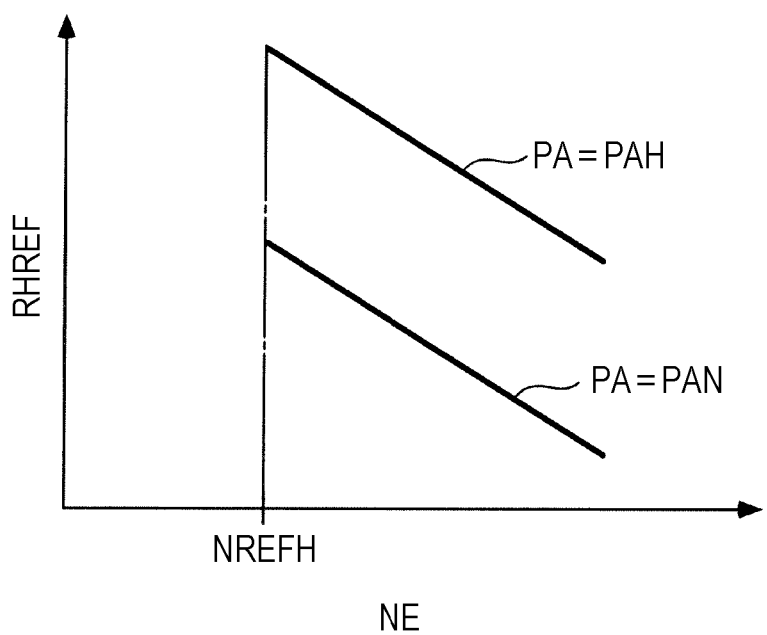
FIG. 13 is a table used for computing a threshold value in the process shown in FIG. 12.

Subsequently, a threshold value RHREF of the amount of retardation of ignition timing RIGH is computed by searching a table shown in FIG. 13 for a value corresponding to the engine speed NE and the atmospheric pressure PA (step S36). The threshold value RHREF is used for determining whether the fuel injection quantity QINJ needs to be limited. The table shown in FIG. 13 includes two sub-tables for low ground (PA=PAN (e.g., 760 mmHg)) and high ground (PA=PAH (e.g., 460 mmHg)). The threshold value RHREF for low ground is greater than that for high ground. The reason for this is that in high ground, the density of air is low and the effective amount of air entering the cylinder is small and, thus, it is not required to further reduce the amount of air.

In addition, in these sub-tables, the threshold value RHREF is set to the smaller value as the engine speed NE increases. The reason for this is that a period of time of a compression stroke assigned to fuel injection from the fuel injection valve 6 is decreased as the engine speed NE increases, and the fuel injection quantity QINJ easily exceeds the maximum fueling rate QMAX of the fuel injection valve 6. Thus, it is more greatly required to reduce the intake air amount GAIR. Note that if the atmospheric pressure PA is not equal to either the value PAN or PAH, the threshold value RHREF is computed using interpolation.

Subsequently, it is determined whether the computed amount of retardation of ignition timing RIGH is greater than the threshold value RHREF (step S37). When the determination is "NO" and if RIGH≤RHREF, the ignition timing TIG is not significantly retarded. Thus, it is determined that the fuel injection quantity QINJ is not limited, and steps S32 to S34 are performed. In this way, a large intake air amount GAIR for a high load operating mode is obtained.

However, if, in step S37, the determination is "YES" and RIGH>RHREF, the ignition timing TIG is significantly retarded. Therefore, it is determined that the fuel injection quantity QINJ needs to be limited. In the steps subsequent to step S38, reduction control for the intake air amount GAIR is performed. In step S38, a difference between the amount of retardation of ignition timing RIGH and the threshold value RHREF is computed as a deviation of the amount of retardation $\Delta$RIGH. The deviation of the amount of retardation $\Delta$RIGH represents the level of the need for limiting the fuel injection quantity QINJ.

Figure 14A:
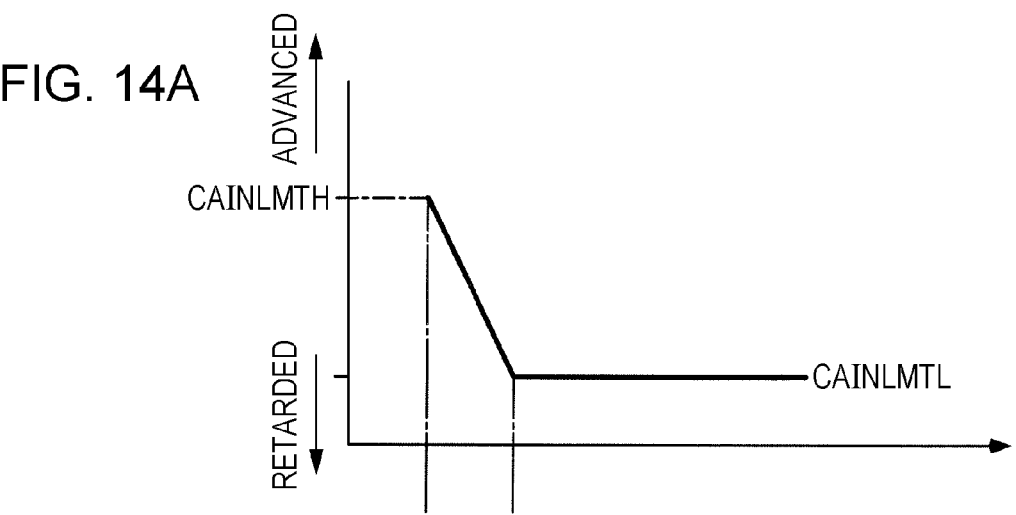
FIG. 14A is a table used for setting a target intake cam phase in the process shown in FIG. 12.

Subsequently, the target intake cam phase CAINCMD is computed by searching a table shown in FIG. 14A for a value corresponding to the computed deviation of the amount of retardation $\Delta$RIGH (step S39). In this table, the target intake cam phase CAINCMD is set to the most advanced value CAINLMTH when the deviation of the amount of retardation $\Delta$RIGH is 0. As the deviation of the amount of retardation $\Delta$RIGH increases, the target intake cam phase CAINCMD is more retarded. In addition, if the deviation of the amount of retardation $\Delta$RIGH is greater than or equal to a first predetermined value $\Delta$R1, the target intake cam phase CAINCMD is set to the most retarded value CAINLMTL. In this way, by setting the target intake cam phase CAINCMD to a more retarded value and closing the air intake valve 8 lately, the amount of air returning towards the intake passage 4 is increased. Thus, the intake air amount GAIR is decreased, and the effective compression ratio is decreased.

Figure 14B:
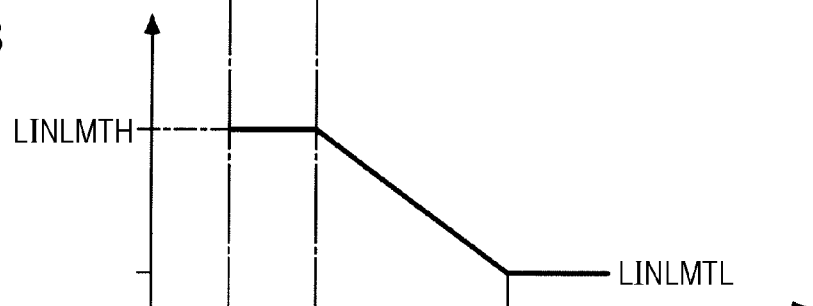
FIG. 14B is a table used for computing a target intake lift in the process shown in FIG. 12.

Subsequently, by searching a table shown in FIG. 14B for a value corresponding to the deviation of the amount of retardation $\Delta$RIGH, the target intake lift LINCMD is computed (step S40). In this table, the target intake lift LINCMD is set to the maximum value LINLMTH when the deviation of the amount of retardation $\Delta$RIGH is less than or equal to the first predetermined value $\Delta$R1. As the deviation of the amount of retardation $\Delta$RIGH increases, the target intake lift LINCMD is set to the smaller value. In addition, if the deviation of the amount of retardation $\Delta$RIGH is greater than or equal to a second predetermined value $\Delta$R2, the target intake lift LINCMD is set to a minimum value LINLMTL. In this way, by decreasing the target intake lift LINCMD, the intake air amount GAIR is further decreased, and the effective compression ratio is further decreased.

Figure 14C:
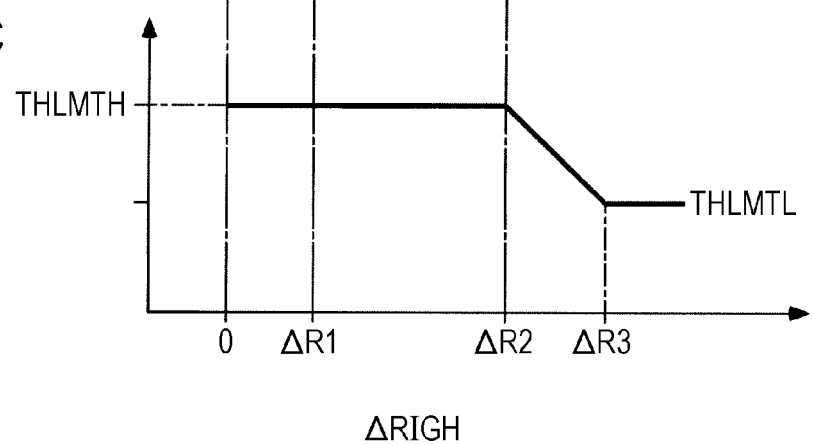
FIG. 14C is a table used for setting a target throttle valve opening level in the process shown in FIG. 12.

Subsequently, the target throttle valve opening THCMD is computed by searching a table shown in FIG. 14C for a value corresponding to the deviation of the amount of retardation $\Delta$RIGH (step S41). Thereafter, this process is completed. In this table, the target throttle valve opening THCMD is set to the maximum value THLMTH when the deviation of the amount of retardation $\Delta$RIGH is less than or equal to the second predetermined value $\Delta$R2. As the deviation of the amount of retardation $\Delta$RIGH increases, the target throttle valve opening THCMD is set to the smaller value. In addition, if the deviation of the amount of retardation $\Delta$RIGH is greater than or equal to a third predetermined value $\Delta$R3, the target throttle valve opening THCMD is set to a minimum value THLMTL. In this way, by decreasing the target throttle valve opening THCMD, the intake air amount GAIR is further decreased.

As described above, in this control process, in order to reduce the intake air amount GAIR in a high rotation speed and high load operation mode, when the amount of retardation of ignition timing RIGH exceeds the threshold value RHREF (i.e., $\Delta$RIGH>0), control is performed so that the intake cam phase CAIN is retarded first. Thereafter, when the deviation of the amount of retardation $\Delta$RIGH is set to the first predetermined value $\Delta$R1 and if the target intake cam phase CAINCMD reaches the most retarded value CAINLMTL, control for reducing the intake lift LIN is started. Thereafter, when the deviation of the amount of retardation $\Delta$RIGH is set to the second predetermined value $\Delta$R2 and if the target intake lift LINCMD reaches the minimum value LINLMTL, control for reducing the throttle valve opening TH is started.

Figure 15:
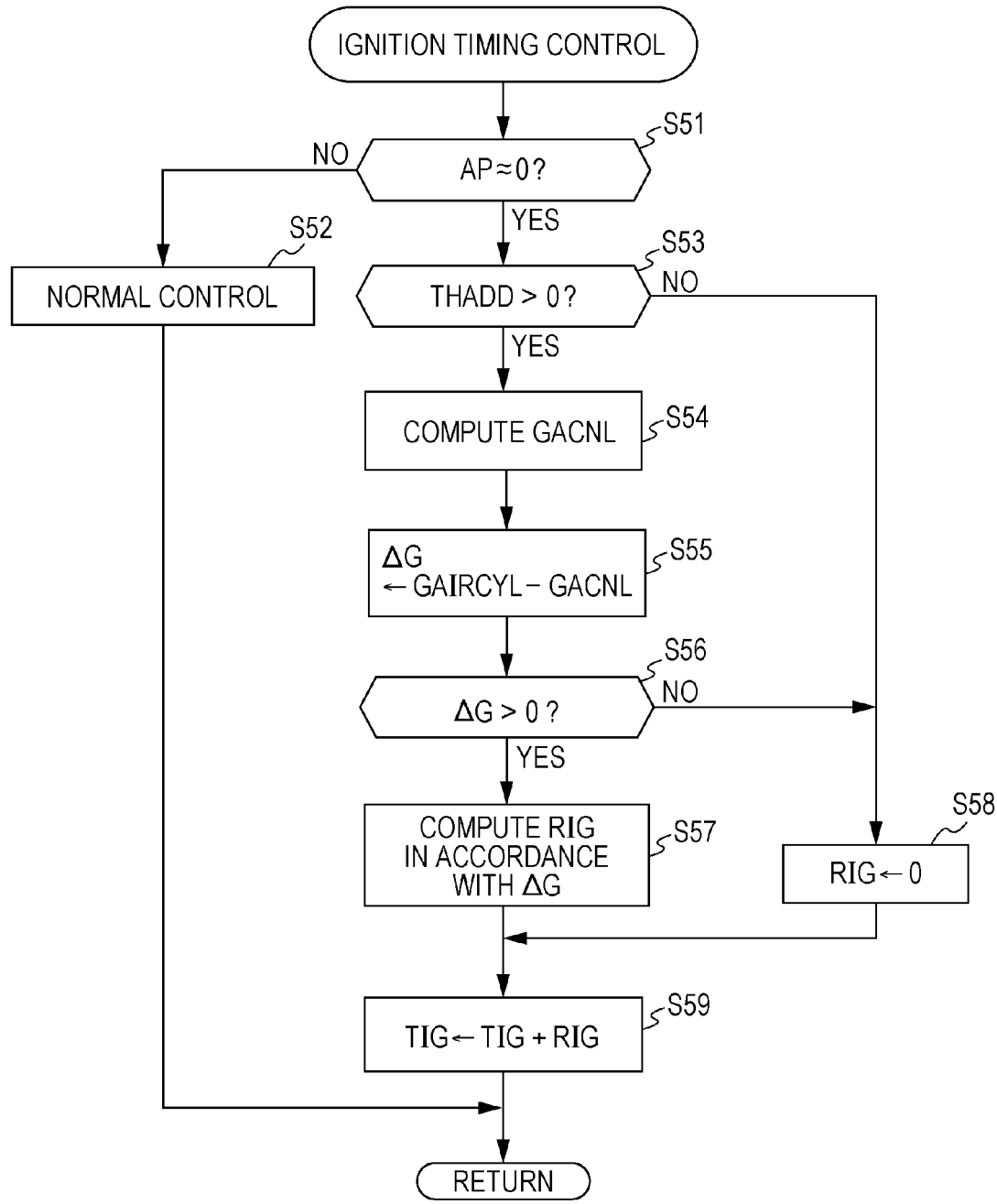
FIG. 15 illustrates a sub-routine indicating a process for controlling ignition timing.

FIG. 15 illustrates a sub-routine for controlling the ignition timing TIG performed in step S2 shown in FIG. 7. In this process, in step S51, it is determined whether the degree of accelerator opening AP is substantially 0. If the determination is "NO" and the engine 3 is not in a deceleration mode, normal control of the ignition timing TIG is performed (step S52). Thereafter, the process is completed. In this normal control, the ignition timing TIG is computed in accordance with the engine speed NE and the required torque PMCMD. In addition, if the occurrence of engine knock of the engine 3 is detected from a result of detection performed by a knocking sensor (not shown), the ignition timing TIG is corrected so as to be retarded in order to prevent the occurrence of engine knock.

However, if, in step S51, the determination is "YES" and the engine 3 is in a deceleration mode, it is determined whether the addition correction term THADD computed in step S25 is greater than 0 (step S53). If the determination is "YES" and the engine 3 is in a control mode in which the intake air amount GAIR is increased, a no-load intake air amount GACNL is computed by searching a table shown in FIG. 16 for a value corresponding to the engine speed NE and the atmospheric pressure PA (step S54). The no-load intake air amount GACNL represents an intake air amount for each intake stroke when the torque generated by the combustion of the engine 3 is the same as the friction of the engine 3 and they are balanced.

Figure 16:
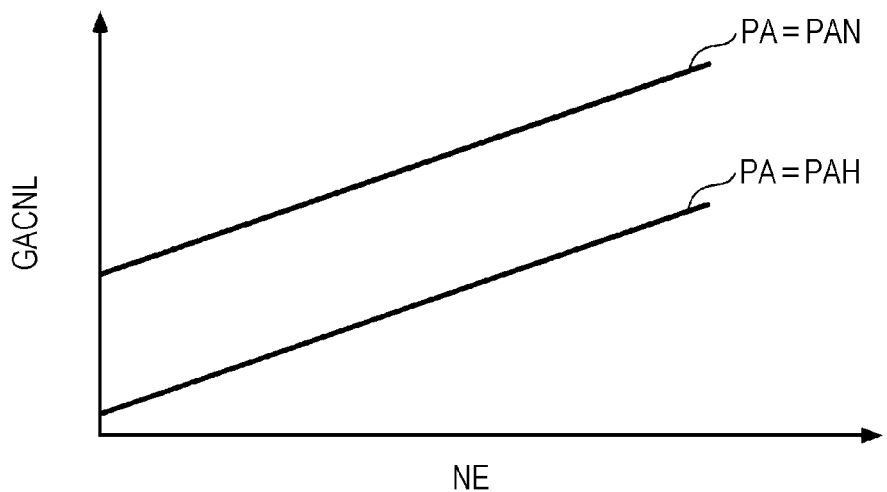
FIG. 16 is a table used for computing a no-load intake air amount in the process shown in FIG. 15.

The table shown in FIG. 16 includes two sub-tables for low ground (PA=PAL) and high ground (PA=PAH). In these sub-tables, the no-load intake air amount GACNL is set to a larger value as the atmospheric pressure PA increases and the engine speed NE increases. Note that if the atmospheric pressure PA is not equal to either the value PAN or PAH, the no-load intake air amount GACNL is computed using interpolation.

Subsequently, a difference between an actual intake air amount GAIRCYL and the no-load intake air amount GACNL is computed as an air amount difference $\Delta G$ (step S55). Note that the actual intake air amount GAIRCYL represents an actual air amount entering the cylinder 3a for each intake stroke. The actual intake air amount GAIRCYL can be obtained by accumulating the intake air amount GAIR detected by the airflow sensor 24.

Figure 17:
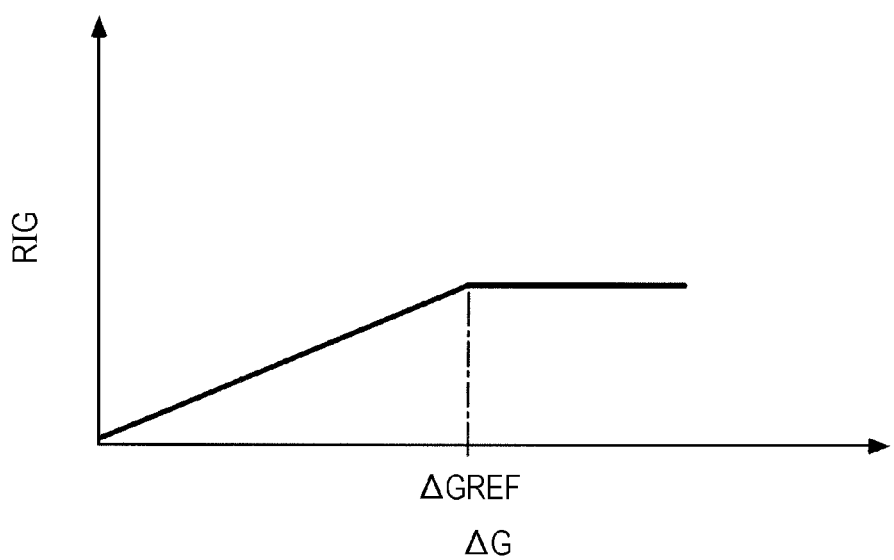
FIG. 17 is a table used for computing a correction amount of retardation in the process shown in FIG. 15.

Subsequently, it is determined whether the air amount difference $\Delta G$ is greater than 0 (step S56). If the determination is "YES" (i.e., $\Delta G>0$), the torque of the engine 3 is larger than the friction and, thus, the output is generated by the engine 3. In such a case, a correction amount of retardation RIG is computed by searching a table shown in FIG. 17 for a value corresponding to the air amount difference $\Delta G$ (step S57). In this table, the correction amount of retardation RIG is set to a larger value as the air amount difference $\Delta G$ increases when the air amount difference $\Delta G$ is less than a predetermined value $\Delta GREF$. However, if the air amount difference $\Delta G$ is greater than or equal to a predetermined value $\Delta GREF$, the correction amount of retardation RIG is set to a constant value. This is to more restrict the torque of the engine 3, since the output of the engine 3 becomes higher as the air amount difference $\Delta G$ increases.

Subsequently, the current ignition timing TIG is computed by adding the correction amount of retardation RIG to the previous ignition timing TIG (step S59). Thereafter, this process is completed.

However, if, in step S53, the determination is "NO" (i.e., the addition correction term THADD$\leq$0), control to increase the intake air amount GAIR is not performed and, thus, it is not necessary to restrict the torque of the engine 3. In such a case, the correction amount of retardation RIG is set to 0 (step S58). Thereafter, the processing proceeds to step S59.

Similarly, if, in step S56, the determination is "NO" (i.e., the air amount difference $\Delta G<0$), it is not necessary to restrict the torque of the engine 3. In such a case, in step S58, the correction amount of retardation RIG is set to 0. Thereafter, the processing proceeds to step S59.

As described above, if, during control to increase the intake air amount GAIR, the actual intake air amount GAIRCYL is greater than the no-load intake air amount GACNL and it is presumed that the output of the engine 3 is generated, the ignition timing TIG is retarded in accordance with the air amount difference $\Delta G$, which is the difference between the two. In this way, the output of the engine 3 can be restricted by restricting the torque of the engine 3.

Figure 18:
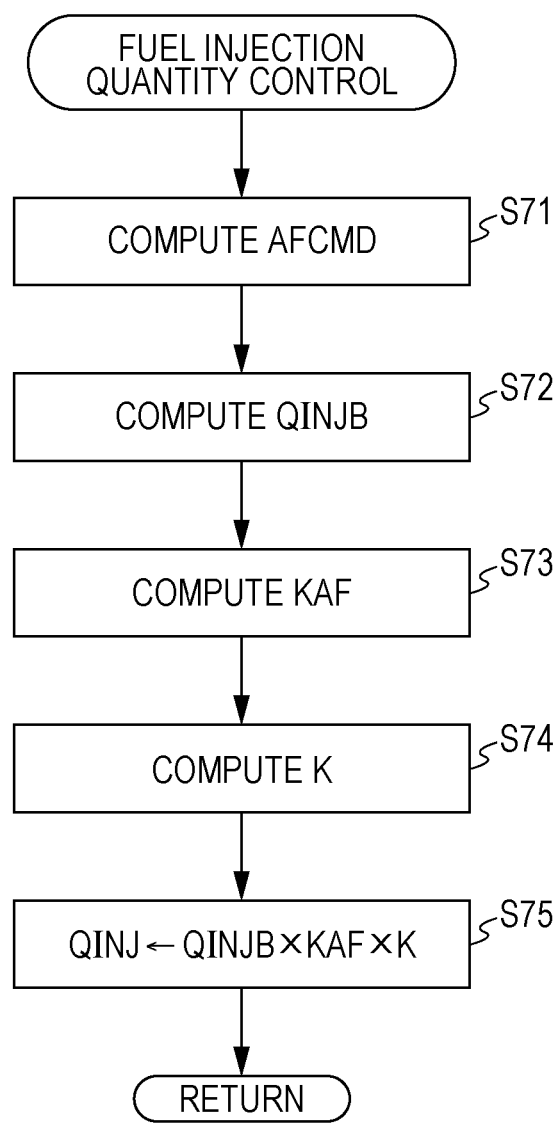
FIG. 18 illustrates a sub-routine for controlling a fuel injection quantity.

FIG. 18 illustrates a sub-routine of the process for controlling the fuel injection quantity QINJ performed in step S3 shown in FIG. 7. In step S71 of this process, a target air-fuel ratio AFCMD is computed by searching a predetermined map (not shown) for a value corresponding to the engine speed NE and the required torque PMCMD.

Subsequently, a base value QINJB of the fuel injection quantity QINJ is computed by searching a predetermined map (not shown) for a value corresponding to the engine speed NE and the required torque PMCMD (step S72). Thereafter, an air-fuel ratio correction coefficient KAF is computed through feedback control so that an air-fuel ratio AF detected by the LAF sensor 28 is equal to the target air-fuel ratio AFCMD (step S73). Thereafter, a correction coefficient K that is different from the air-fuel ratio correction coefficient KAF is computed (step S74).

Subsequently, the base value QINJB is multiplied by the air-fuel ratio correction coefficient KAF and the correction coefficient K. Thus, the fuel injection quantity QINJ is computed (step S75). Thereafter, this process is completed. In this way, the fuel injection quantity QINJ is computed so that the air-fuel ratio AF is set to the target air-fuel ratio AFCMD.

As described above, according to the present embodiment, in the processes shown in FIGS. 8 and 9, when it is determined that the engine 3 is in a deceleration mode with fuel being supplied from the fuel injection valve 6 ("YES" in step S11 or "NO" in step S21), control is performed so that the intake air amount GAIR is increased by increasing the target throttle valve opening THCMD. Thus, since the air-fuel ratio AF is controlled so as to be set to the target air-fuel ratio AFCMD, the fuel injection quantity QINJ is increased. Accordingly, the fuel injection quantity QINJ is not less than the minimum fuel supply amount QMIN of the fuel injection valve 6. As a result, the air-fuel ratio AF can be accurately controlled and, thus, the excellent exhaust gas characteristic and the excellent drivability can be maintained.

In addition, in order to increase the intake air amount GAIR, the addition correction term THADD for the target throttle valve opening THCMD is computed in accordance with the atmospheric pressure PA and the engine speed NE. In this way, the intake air amount GAIR can be increased to an optimal value so that the fuel injection quantity QINJ is not less than the minimum fuel supply amount QMIN. As a result, a wasteful output and wasteful fuel consumption of the engine 3 can be prevented.

Furthermore, according to the present embodiment, since the fuel injection valve 6 is configured as an in-cylinder fuel injection valve, the fuel injection quantity QINJ is easily made to be less than the minimum fuel supply amount QMIN of the fuel injection valve 6. As a result, in particular, the above-described advantage can be effectively provided.

Still furthermore, in the process for controlling the ignition timing TIG shown in FIG. 15, if the air amount difference ΔG between the actual intake air amount GAIRCYL and the no-load intake air amount GACNL is greater than 0 during control to increase the intake air amount GAIR ("YES" in step S56), the ignition timing TIG is retarded. In this way, even when the fuel injection quantity QINJ is increased through control to increase the intake air amount GAIR, the output of the engine 3 can be restricted and, therefore, excellent drivability can be maintained.

Yet still furthermore, in the processes shown in FIGS. 8 and 12, if the engine 3 is in the high rotation speed and high load operation mode in which cooling is required by increasing the amount of fuel ("YES" in step S13, "YES" in step S31, or "YES" in step S37), the intake air amount GAIR is decreased by controlling the intake cam phase CAIN, the intake lift LIN, and the throttle valve opening TH. In this way, since the air-fuel ratio AF is controlled so as to be set to the target air-fuel ratio AFCMD, the fuel injection quantity QINJ is decreased. Thus, the fuel injection quantity QINJ does not exceed the maximum fueling rate QMAX of the fuel injection valve 6. As a result, the air-fuel ratio AF can be accurately controlled and, therefore, excellent exhaust gas characteristics and excellent drivability can be maintained.

Yet still furthermore, since the fuel injection valve 6 is configured as an in-cylinder fuel injection valve, the fuel injection quantity QINJ easily exceeds the maximum fueling rate QMAX of the fuel injection valve 6. Therefore, in particular, the above-described advantage can be effectively provided.

Yet still furthermore, the threshold value RHREF is computed in accordance with the engine speed NE and the atmospheric pressure PA (step S36). In addition, when the amount of retardation of ignition timing RIGH is higher than the threshold value RHREF ("YES" in step S37), the target intake cam phase CAINCMD, the target intake lift LINCMD, and the target throttle valve opening THCMD are set in accordance with the deviation of the amount of retardation ΔRIGH, which is the difference between the amount of retardation of ignition timing RIGH and the threshold value RHREF (steps S39 to S41). In this way, control to decrease the intake air amount GAIR can be appropriately performed in accordance with the level of the need.

In addition, in the control to decrease the intake air amount GAIR, the intake cam phase CAIN is retarded and the intake lift LIN is decreased. In this way, the effective compression ratio is decreased, and engine knock is prevented. Since retardation of the ignition timing TIG is prevented, the rise of the temperature of the three-way catalyst 31 can be prevented. As a result, the level of the need for increasing the amount of fuel is decreased. Accordingly, a decreased amount of the intake air amount GAIR is also decreased. Consequently, a decrease in the torque due to a decrease in the intake air amount GAIR can be prevented.

Furthermore, in order to decrease the intake air amount GAIR, the control to retard the intake cam phase CAIN is performed firstly. The control to decrease the intake lift LIN is performed secondly. The control to decrease the throttle valve opening TH is performed thirdly. As a result, the advantage that the intake air amount GAIR is reduced while preventing a decrease in torque can be maximally provided.

Figure 19:
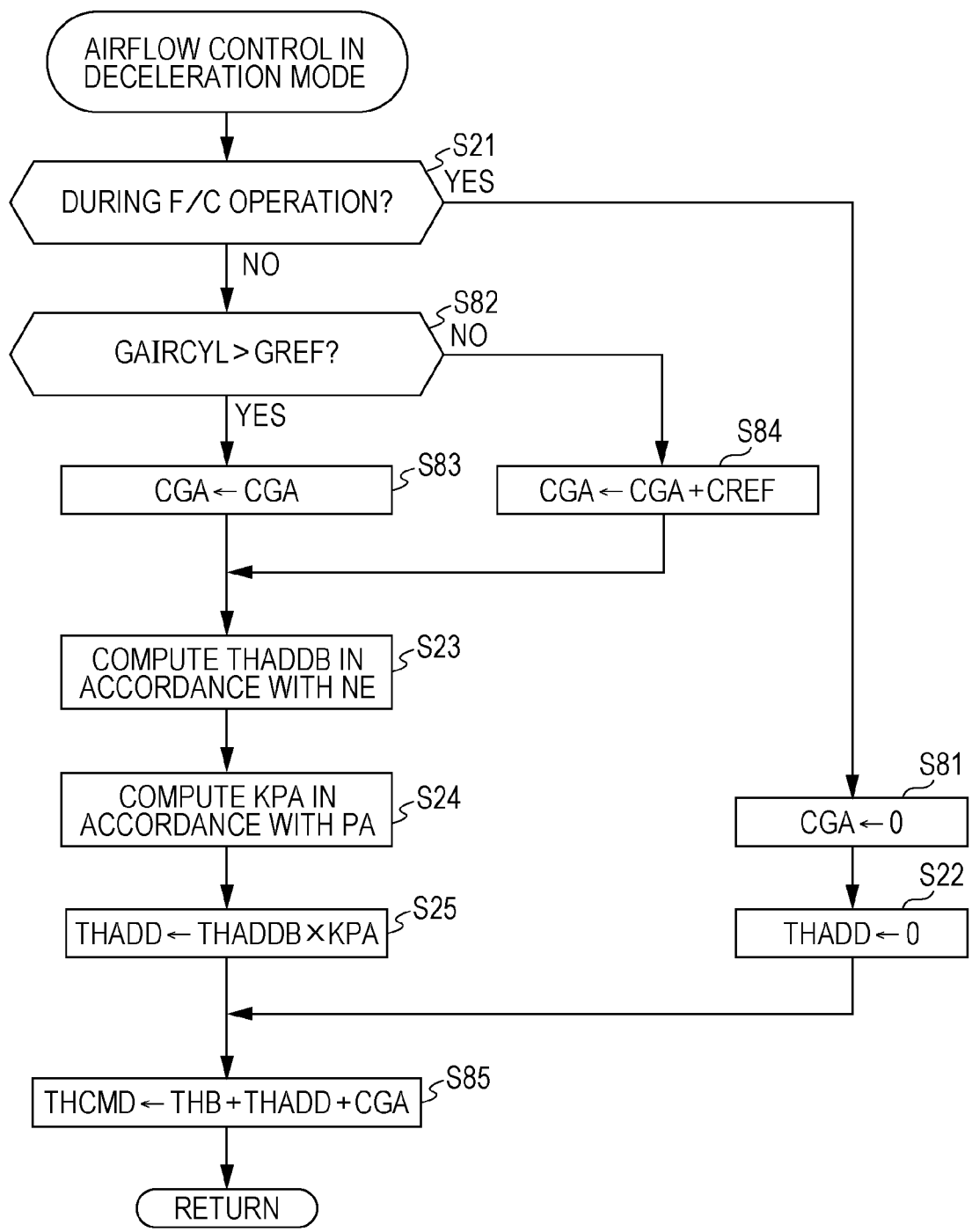
FIG. 19 illustrates a sub-routine indicating an airflow control process in a deceleration mode according to a first modification.

FIG. 19 illustrates an airflow control process performed in a deceleration mode according to a first modification that can be performed instead of the process shown in FIG. 9. Note that the same numbering will be used in describing FIG. 19 as was utilized above in describing FIG. 9, and detailed description thereof is not repeated. In step S21 of this process, it is determined whether an F/C operation is being performed. If the determination is "YES", an air amount correction term CGA is set to 0 (step S81). In addition, the addition correction term THADD is set to 0 (step S22).

Subsequently, the air amount correction term CGA and the addition correction term THADD are added to the base value THB of the throttle valve opening TH. Thus, the target throttle valve opening THCMD is computed (step S85). Thereafter, this process is completed. In this case, CGA=THADD=0. Consequently, the target throttle valve opening THCMD is equal to the base value THB.

However, if, in step S21, the determination is "NO" and the engine 3 is in a deceleration mode with fuel being supplied to the engine 3, control to increase the intake air amount GAIR is performed in steps subsequent to step S82. In step S82, it is determined whether the actual intake air amount GAIRCYL is greater than a predetermined amount GREF. The predetermined amount GREF represents an intake air amount corresponding to the minimum fuel supply amount QMIN of the fuel injection quantity QINJ.

If, in step S82, the determination is "YES", the current air amount correction term CGA is set to the previous air amount correction term CGA (step S83). However, if, in step S82, the determination is "NO" (i.e., the actual intake air amount GAIRCYL<the predetermined amount GREF), the current air amount correction term CGA is set to the sum of the previous air amount correction term CGA and a predetermined value CREF (step S84).

After step S83 or S84 is performed, steps S23 to S25 are performed. In steps S23 to S25, the addition correction term THADD is computed in accordance with the engine speed NE and the atmospheric pressure PA. Thereafter, step S85 is performed. In step S85, the air amount correction term CGA and the addition correction term THADD are added to the base value THB of the throttle valve opening TH. Thus, the target throttle valve opening THCMD is computed. Thereafter, this process is completed.

As described above, according to the first modification, if the actual intake air amount GAIRCYL is less than or equal to the predetermined amount GREF during control to increase the intake air amount GAIR, the target throttle valve opening THCMD is increased by the predetermined value CREF. In this way, when it is presumed that the intake air amount GAIR is actually smaller than the air amount corresponding to the minimum fuel supply amount QMIN of the fuel injection valve 6, the intake air amount GAIR is appropriately increased so that the shortage is compensated for.

Figure 20:
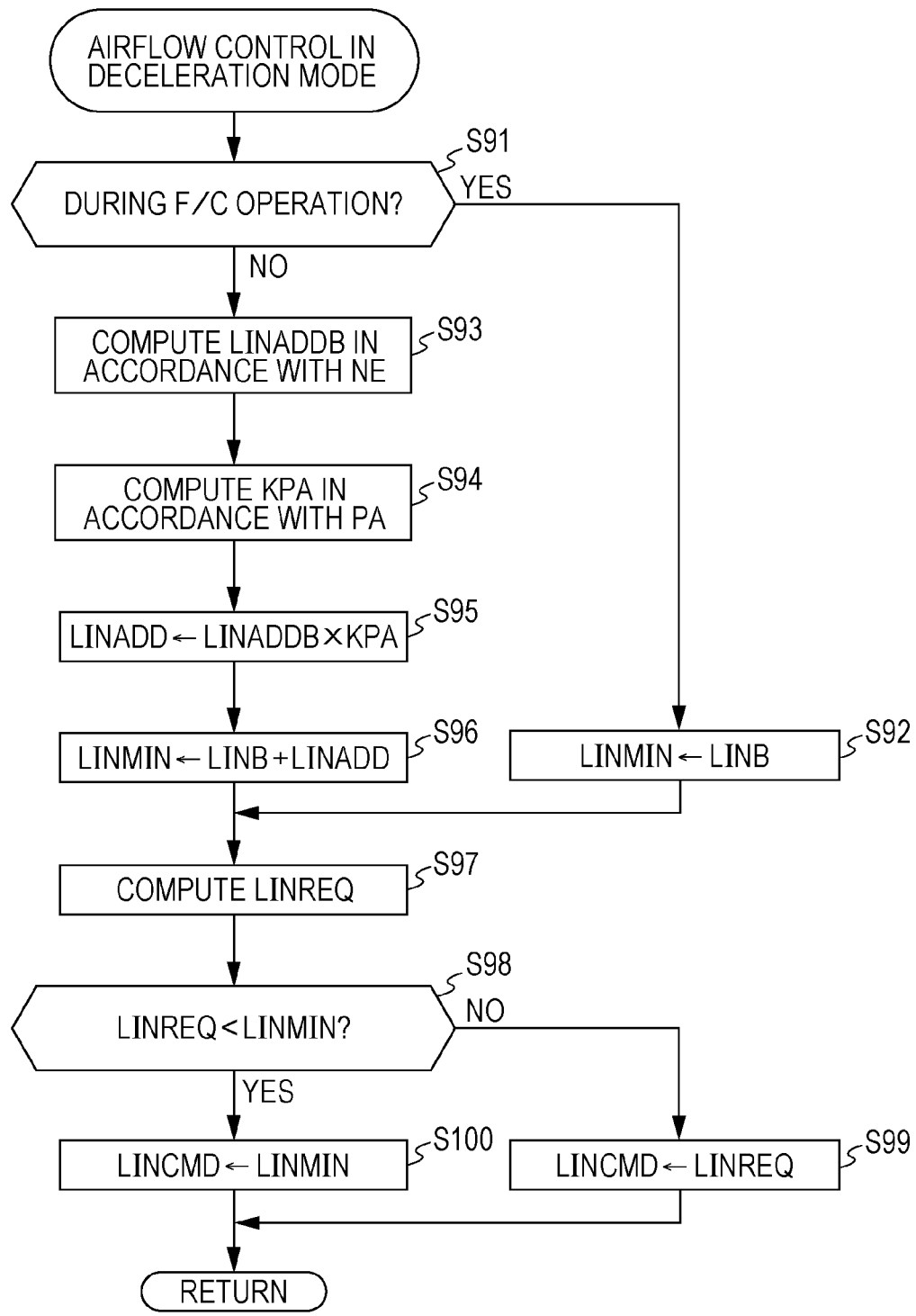
FIG. 20 illustrates a sub-routine indicating an airflow control process in a deceleration mode according to a second modification.

FIG. 20 illustrates the airflow control process in a deceleration mode according to a second modification. In this process, control to increase the intake air amount GAIR is performed using the intake lift LIN. In step S91 of this process, it is determined whether an F/C operation is being performed. If the determination is "YES", a lower limit value LINMIN of the target intake lift LINCMD is set to a predetermined minimum lift LINB (e.g., 1.0 mm) (step S92).

Figure 21:
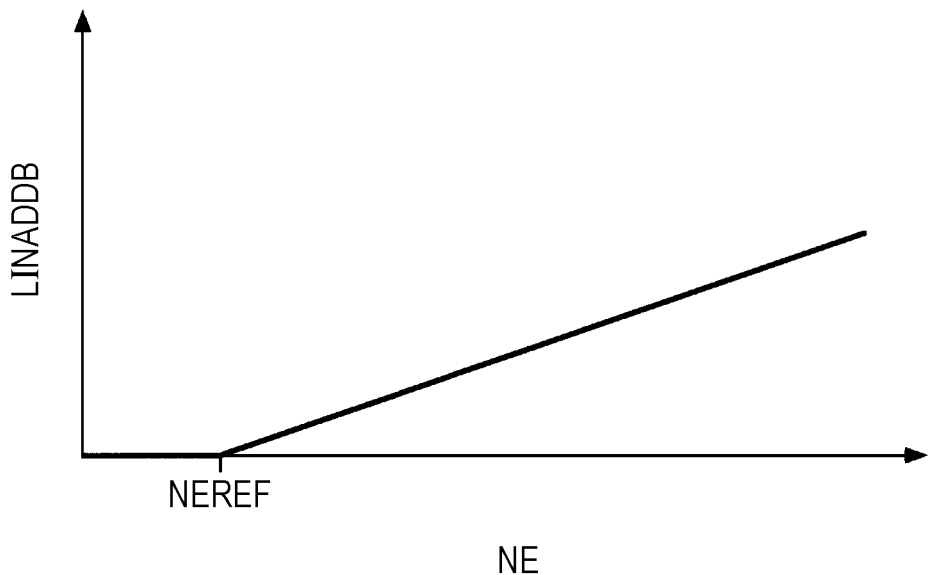
FIG. 21 is a table used for computing a base value of an addition correction term in the process shown in FIG. 20.

However, if, in step S91, the determination is "NO" and the engine 3 is in a deceleration mode with fuel being supplied to the engine 3, control to increase the intake air amount GAIR is performed in steps subsequent to step S93. In step S93, a base value LINADDB of an addition correction term LINADD is computed by searching a table shown in FIG. 21 for a value corresponding to the engine speed NE. In this table, the base value LINADDB is set to a predetermined value (e.g., 0) when the engine speed NE is lower than the predetermined rotation speed NEREF. However, when the engine speed NE is higher than or equal to the predetermined rotation speed NEREF, the base value LINADDB is set to a larger value as the engine speed NE increases.

Subsequently, as in step S24 shown in FIG. 9, the atmospheric pressure correction coefficient KPA is computed by searching the table shown in FIG. 11 for a value corresponding to the atmospheric pressure PA (step S94). Thereafter, the base value LINADDB is multiplied by the atmospheric pressure correction coefficient KPA. Thus, the addition correction term LINADD is computed (step S95).

Subsequently, the computed addition correction term LINADD is added to the minimum lift LINB. Thus, the lower limit value LINMIN of the target intake lift LINCMD is computed (step S96). In step S97 subsequent to step S92 or S96, a required intake lift LINREQ is computed by searching a predetermined table (not shown) for a value corresponding to the required torque PMCMD.

Subsequently, it is determined whether the obtained required intake lift LINREQ is less than the lower limit value LINMIN (step S98). If the determination is "NO", the target intake lift LINCMD is set to the required intake lift LINREQ (step S99). Thereafter, this process is completed. However, if, in step S98, the determination is "YES" and LINREQ<LINMIN, the target intake lift LINCMD is set to the lower limit value LINMIN (step S100). Thereafter, this process is completed.

As described above, according to the second modification, when the engine 3 is in a deceleration mode with fuel being supplied to the engine 3, the lower limit value LINMIN of the target intake lift LINCMD is corrected to a larger value by adding the addition correction term LINADD to the minimum lift LINB. In this way, since the intake lift LIN is increased, the intake air amount GAIR is increased. In addition, since the above-described addition correction term LINADD is computed in accordance with the engine speed NE and the atmospheric pressure PA, the intake air amount GAIR can be increased to an optimal value.

Figure 22:
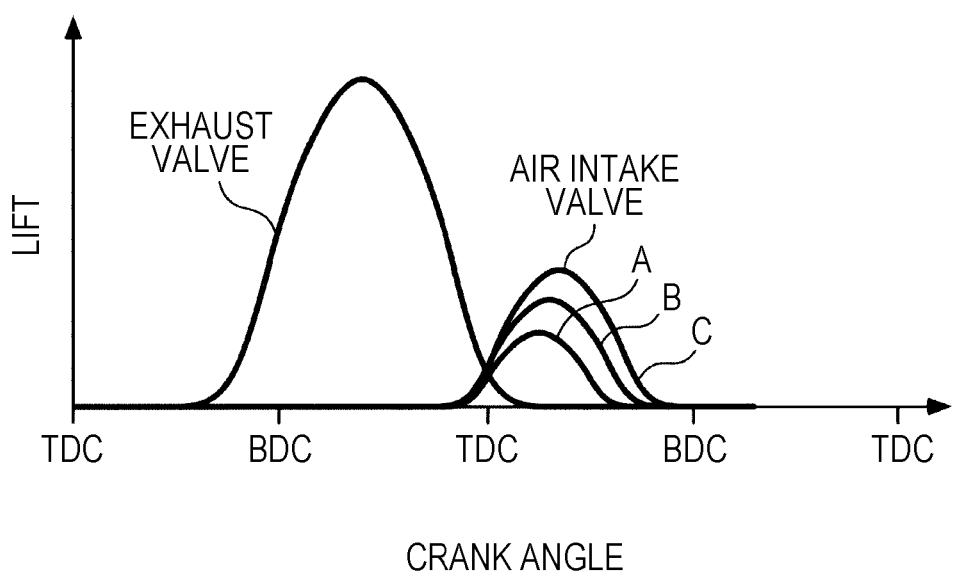
FIG. 22 illustrates a valve lift curve obtained when the intake lift is varied.
Figure 23:
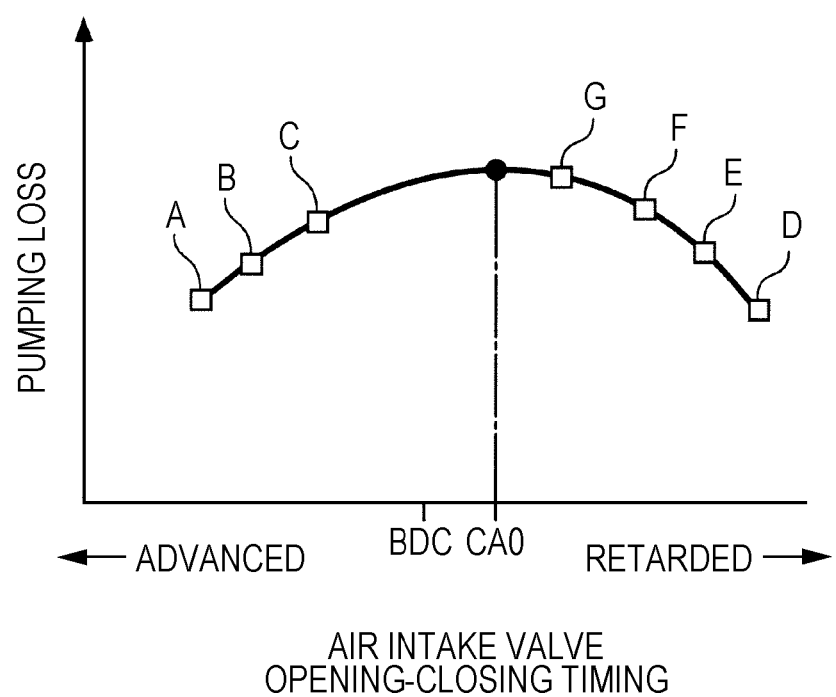
FIG. 23 illustrates a relationship between the air intake valve closing timing and pumping loss.

Furthermore, if, as shown in FIG. 22, the intake lift LIN is increased from the minimum lift LINB (A to C via B in FIG. 22), the closing valve timing of the air intake valves 8 is made close to the bottom dead center (BDC), as shown in FIG. 23. Thus, pumping loss increases and, therefore, the torque of the engine 3 decreases. According to the second modification, by increasing the intake lift LIN, the intake air amount GAIR can be increased. At the same time, the output of the engine 3 can be restricted.

Figure 24:
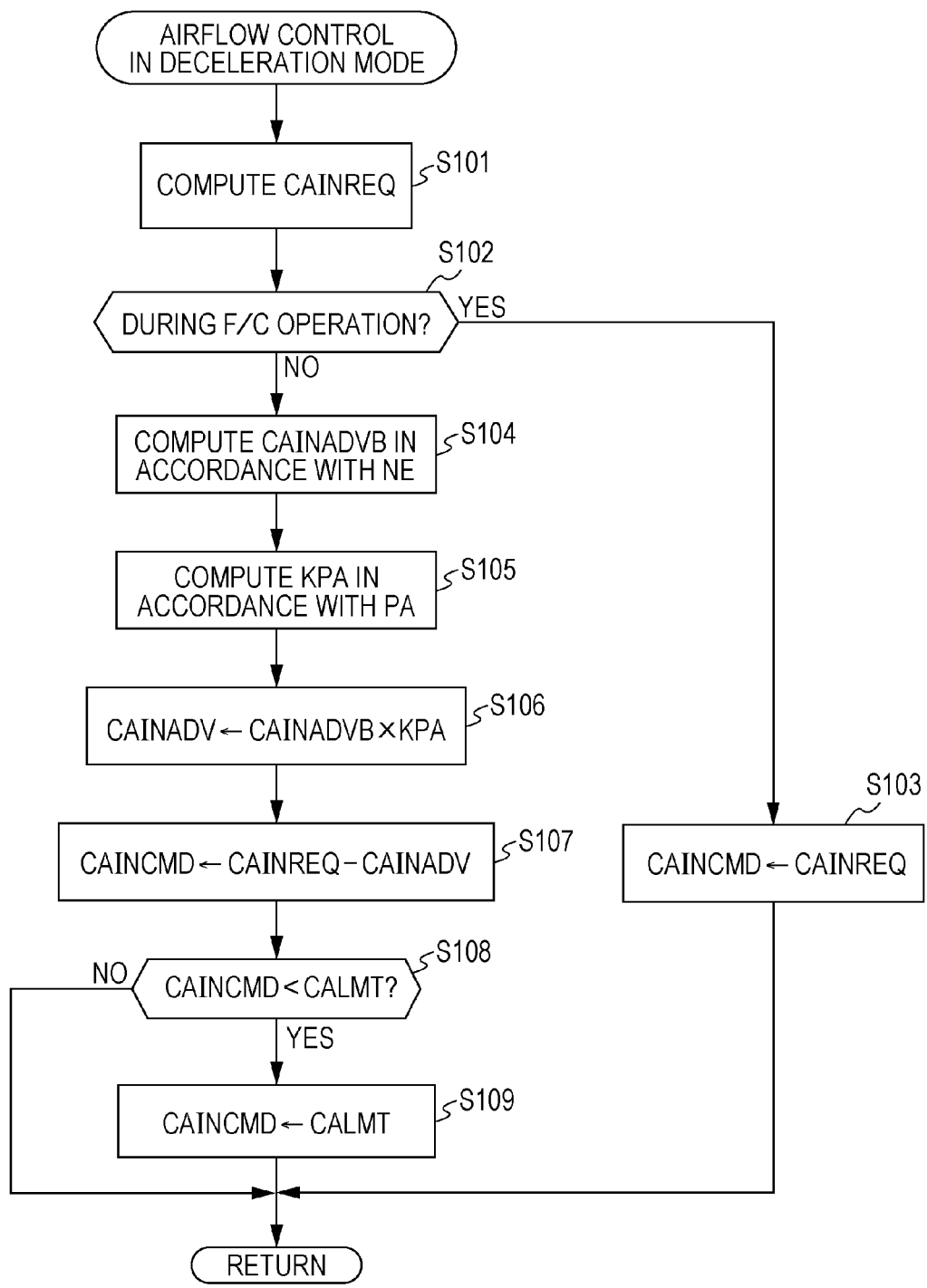
FIG. 24 illustrates a sub-routine indicating an airflow control process in a deceleration mode according to a third modification.

FIG. 24 illustrates an airflow control process in a deceleration mode according to a third modification. In this process, control to increase the intake air amount GAIR is performed using the intake cam phase CAIN. In step S101 of this process, a required intake cam phase CAINREQ is computed by searching a predetermined table (not shown) for a value corresponding to the required torque PMCMD. Thereafter, it is determined whether an F/C operation is being performed (step S102). If the determination is "YES", the target intake cam phase CAINCMD is set to the required intake cam phase CAINREQ (step S103). Thereafter, the process is completed.

Figure 25:
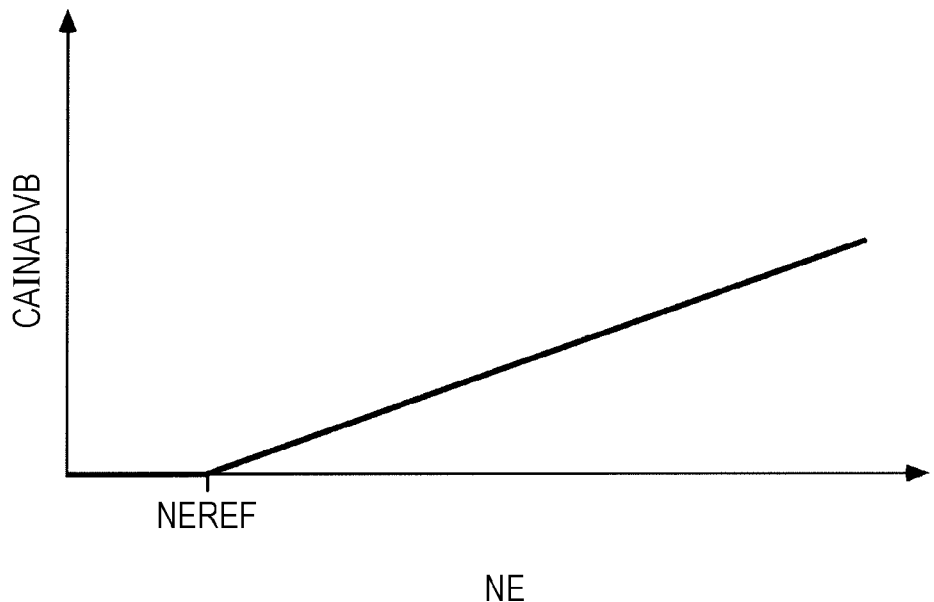
FIG. 25 is a table used for computing a base value of an advance correction term in the process shown in FIG. 24.

However, if, in step S102, the determination is "NO" and the engine 3 is in a deceleration mode with fuel being supplied to the engine 3, control to increase the intake air amount GAIR is performed in steps subsequent to step S104. In step S104, a base value CAINADVB of an advance correction term CAINADV is computed by searching a table shown in FIG. 25 for a value corresponding to the engine speed NE. In this table, when the engine speed NE is lower than the predetermined rotation speed NEREF, the base value CAINADVB is set to a predetermined value (e.g., 0). However, when the engine speed NE is greater than or equal to the predetermined rotation speed NEREF, the base value CAINADVB is set to a larger value as the engine speed NE increases.

Subsequently, as in step S24 shown in FIG. 9, the atmospheric pressure correction coefficient KPA is computed by searching the table shown in FIG. 11 for a value corresponding to the atmospheric pressure PA (step S105). Thereafter, the advance correction term CAINADV is computed by multiplying the base value CAINADVB by the atmospheric pressure correction coefficient KPA (step S106).

Subsequently, the target intake cam phase CAINCMD is computed by subtracting the obtained advance correction term CAINADV from the required intake cam phase CAINREQ (step S107). Thereafter, it is determined whether the obtained target intake cam phase CAINCMD is less than a predetermined lower limit value CALMT (step S108). The lower limit value CALMT corresponds to the intake cam phase that provides the closing valve timing (CA0 in FIG. 23) of the air intake valves 8 at which the pumping loss is maximized in FIG. 23.

If, in step S108, the determination is "NO", this process is immediately completed. However, if, in step S108, the determination is "YES" and CAINCMD<CALMT, the target intake cam phase CAINCMD is set to the lower limit value CALMT (step S109). Thereafter, the process is completed. In this way, by limiting the target intake cam phase CAINCMD to the lower limit CALMT, advancing of the intake lift LIN beyond the phase at which maximum pumping loss is provided can be prevented.

As described above, according to the third modification, if the engine 3 is in a deceleration mode with fuel being supplied to the engine 3, the target intake cam phase CAINCMD is corrected so as to be advanced by subtracting the advance correction term CAINADV from the required intake cam phase CAINREQ. In this way, the intake cam phase CAIN is controlled so as to be advanced and, therefore, the closing timing of the air intake valves 8 is advanced. Thus, since the amount of air returning to the intake passage 4 becomes smaller, the intake air amount GAIR is increased. In addition, since the above-described advance correction term CAINADV is computed in accordance with the engine speed NE and the atmospheric pressure PA, the intake air amount GAIR can be increased to an optimal value.

Figure 26:
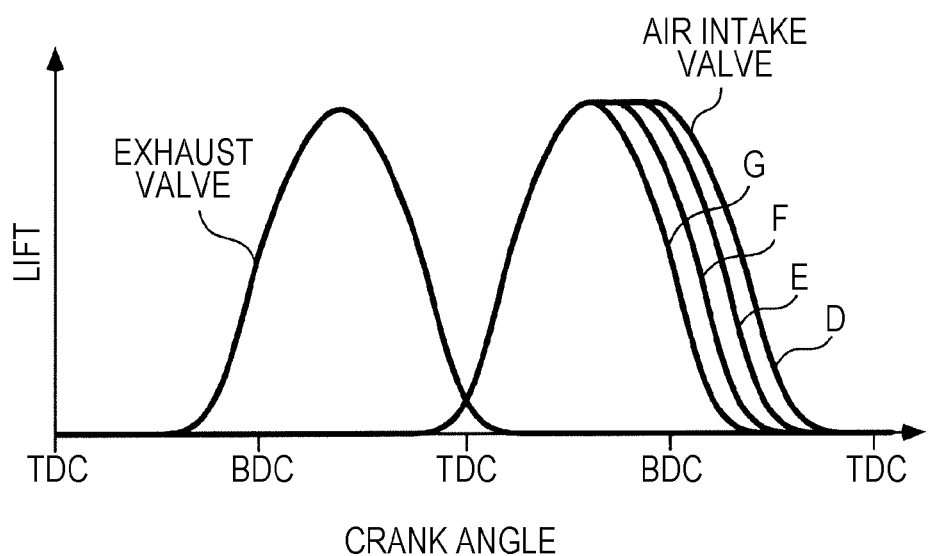
FIG. 26 illustrates a valve lift curve obtained when the intake cam phase is varied.

Furthermore, as shown in FIG. 26, if the intake cam phase CAIN is advanced (D to G via E and F in FIG. 26), the closing timing of the air intake valve 8 approaches the bottom dead center. Thus, the pumping loss increases, and the torque of the engine 3 is decreased. According to the third modification, by advancing the intake cam phase CAIN, the intake air amount GAIR can be increased, as in the second modification. At the same time, the output of the engine 3 can be restricted.

It should be noted that the present invention is not limited to the above-described embodiments, but the present invention can be realized by a variety of embodiments. For example, while the above-described embodiments have been described with reference to the intake air adjusting unit including the throttle valve 10a, the intake lift varying mechanism 50, and the intake cam phase varying mechanism 60, the intake air adjusting unit may include only one of the throttle valve 10a, the intake lift varying mechanism 50, and the intake cam phase varying mechanism 60 or a combination of any two of the throttle valve 10a, the intake lift varying mechanism 50, and the intake cam phase varying mechanism 60.

In addition, in the above-described embodiments, determination as to whether the engine 3 is in a high rotation speed and high load operation mode in which cooling is required by increasing the amount of fuel is made on the basis of the ignition timing TIG. However, another appropriate parameter may be used instead of the ignition timing TIG or in addition to the ignition timing TIG.

Furthermore, while the above-described embodiments have been described with reference to a gasoline engine for a vehicle, the present invention is not limited thereto. For example, the embodiment of the present invention is applicable to a variety of engines, such as diesel engines. In addition, the embodiment of the present invention is applicable to engines other than engines for vehicles. For example, the embodiment of the present invention is applicable to ship propulsion engines including a crankshaft vertically disposed, such as an outboard engine. Still furthermore, it should be understood by those skilled in the art that various modifications, combinations, sub-combinations and alterations may occur depending on design requirements and other factors insofar as they are within the scope of the appended claims or the equivalents thereof.

According to the embodiment of the present invention, the intake air amount drawn into the cylinder is adjusted by the intake air adjusting unit. In addition, if it is determined that the internal-combustion engine is in a predetermined high rotation speed and high load operation mode in which cooling is required by increasing an amount of fuel, control is performed so that the intake air amount is reduced. Since control is performed so that the air-fuel ratio of an air-fuel mixture is set to a predetermined air-fuel ratio when the intake air amount is decreased, the fuel injection quantity is decreased. In this way, the fuel injection quantity does not exceed the maximum fueling rate of the fuel injection valve. As a result, the air-fuel ratio can be accurately controlled and set to the predetermined air-fuel ratio and, thus, an excellent exhaust gas characteristic and excellent drivability can be maintained.

In addition, as the rotation speed of the internal-combustion engine increases, the period of time required for one combustion cycle is reduced. Since the fuel injection quantity suppliable by the fuel injection valve during a predetermined stroke time is reduced, the fuel injection quantity easily exceeds the maximum fueling rate of the fuel injection valve. Thus, it is more greatly required to reduce the intake air amount. Furthermore, as the ignition timing is more retarded, the temperature of exhaust gas further rises. If a catalyst is disposed in an exhaust passage, the temperature of the catalyst easily rises. Thus, in order to cool the catalyst, it is more greatly required to increase the amount of the fuel. Accordingly, it is more greatly required to reduce the intake air amount. According to the embodiment, control is performed so that the intake air amount is reduced in accordance with the detected engine speed of the internal-combustion engine and the acquired ignition timing. Therefore, the control to reduce intake air amount can be optimally performed.

In the intake air control apparatus 1 of the internal-combustion engine 3, the intake air adjusting unit can include a variable valving mechanism (an intake lift varying mechanism 50 and an intake cam phase varying mechanism 60) that changes an operating characteristic of an air intake valve 8 of the internal-combustion engine 3.

According to such a structure, the intake air amount can be reduced by changing, for example, the opening-closing timing of the air intake valve and/or the lift (the maximum lifting height). When the operating characteristic of the air intake valve is changed, the effective compression ratio of the internal-combustion engine changes. Thus, by changing the operating characteristic of the air intake valve so that the effective compression ratio of the internal-combustion engine is reduced, the occurrence of engine knock can be prevented. In this way, by preventing retardation of the ignition timing, overheating of the catalyst can be prevented. As a result, the level of the need for increasing the fuel quantity can be reduced. Accordingly, a decrease in the intake air amount can be reduced. Consequently, a decrease in torque caused by the decrease in the intake air amount can be prevented.

In the intake air control apparatus 1 of the internal-combustion engine 3, the intake air adjusting unit can include a throttle valve 10a for narrowing an intake passage 4 in addition to the variable valving mechanism, and the intake air reduction control unit can perform control to reduce an intake air amount GAIR using the variable valving mechanism and, thereafter, start control to reduce the intake air amount GAIR using the throttle valve 10a when an amount of operation of the variable valving mechanism (a target intake cam phase CAINCMD, a target intake lift LINCMD) reaches a limit value for reduction in the intake air amount GAIR (the most retarded value CAINLMTL, a minimum value LINLMTL).

According to such a structure, when control to reduce the intake air amount is started, reduction control using the variable valving mechanism is performed first. Thereafter, when an amount of operation of the variable valving mechanism reaches a limit value for reduction in intake air amount, reduction control using the throttle valve is performed. In this way, by performing reduction control using the variable valving mechanism first, the advantage that the intake air amount is reduced while preventing a decrease in torque can be maximally provided.

In the intake air control apparatus 1 of the internal-combustion engine 3, the fuel injection valve 6 can be an in-cylinder fuel injection valve that directly injects fuel into the cylinder 3a.

If an in-cylinder fuel injection valve is used, the effective fuel injection period of time in one combustion cycle is significantly short, as compared with that required for a port fuel injection valve (e.g., the fuel injection period of time is limited to within a compression stroke). Accordingly, it is difficult to ensure a required fuel injection quantity within the limited injection period of time and, therefore, the fuel injection quantity easily exceeds the maximum fueling rate of the fuel injection valve. However, if an in-cylinder fuel injection valve is used, the above-described advantage the embodiment of the present invention can be, in particular, effectively provided.

Obviously, numerous modifications and variations of the present invention are possible in light of the above teachings. It is therefore to be understood that within the scope of the appended claims, the invention may be practiced otherwise than as specifically described herein.

What is claimed is:

1. An intake air control apparatus for an internal-combustion engine in which an air-fuel ratio of an air-fuel mixture of fuel injected from a fuel injection valve and air drawn into a cylinder is controlled so as to be a predetermined value, the intake air control apparatus comprising:

an intake air adjusting device configured to adjust an intake air amount;

a rotation speed detector configured to detect a rotation speed of the internal-combustion engine;

an ignition timing acquiring device configured to acquire ignition timing for the internal-combustion engine;

an operating mode determination device configured to determine whether the internal-combustion engine is in a predetermined high rotation speed and high load operation mode in which cooling is required by increasing an amount of fuel; and an intake air reduction controller configured to, if the operating mode determination device determines that the internal-combustion engine is in the predetermined high rotation speed and high load operation mode, control the intake air adjusting device so that the intake air amount is reduced in accordance with the rotation speed of the internal-combustion engine detected by the rotation speed detector and the ignition timing acquired by the ignition timing acquiring device in order to restrict a fuel injection quantity to be injected from the fuel injection valve so that the fuel injection quantity does not exceed a maximum fueling rate of the fuel injection valve.

2. The intake air control apparatus according to claim 1, wherein the intake air adjusting device includes a variable valving mechanism to change an operating characteristic of an air intake valve of the internal-combustion engine.

3. The intake air control apparatus according to claim 2, wherein the intake air adjusting device further includes a throttle valve to narrow an intake passage, and
wherein the intake air reduction controller performs control to reduce an intake air amount using the variable valving mechanism and, thereafter, starts control to reduce the intake air amount using the throttle valve when an amount of operation of the variable valving mechanism reaches a limit value for reduction in the intake air amount.

4. The intake air control apparatus according to claim 1, wherein the fuel injection valve comprises an in-cylinder fuel injection valve that directly injects fuel into the cylinder.

5. An intake air control method for an internal-combustion engine in which an air-fuel ratio of an air-fuel mixture is controlled so as to be a predetermined value, the intake air control method comprising:
adjusting an intake air amount;
detecting a rotation speed of the internal-combustion engine;
acquiring ignition timing for the internal-combustion engine;
determining whether the internal-combustion engine is in a predetermined high rotation speed and high load operation mode in which cooling is required by increasing an amount of fuel; and
reducing the intake air amount in accordance with the rotation speed of the internal-combustion engine and the ignition timing in order to restrict a fuel injection quantity to be injected from a fuel injection valve so that the fuel injection quantity does not exceed a maximum fueling rate of the fuel injection valve if the internal-combustion engine is in the predetermined high rotation speed and high load operation mode.

6. The intake air control method according to claim 5, further comprising:
providing a variable valving mechanism to change an operating characteristic of an air intake valve of the internal-combustion engine.

7. The intake air control method according to claim 6, further comprising:
providing a throttle valve to narrow an intake passage;
reducing an intake air amount using the variable valving mechanism; and
starting to reduce the intake air amount using the throttle valve when an amount of operation of the variable valving mechanism reaches a limit value for reduction in the intake air amount.

8. The intake air control method according to claim 5, wherein the fuel injection valve comprises an in-cylinder fuel injection valve that directly injects fuel into the cylinder.

* * * * *